US011163711B2

(12) United States Patent
Goda et al.

(10) Patent No.: US 11,163,711 B2
(45) Date of Patent: Nov. 2, 2021

(54) MEMORY ACCESS SYSTEM, METHOD FOR CONTROLLING THE SAME, COMPUTER-READABLE STORAGE MEDIUM, AND IMAGE FORMING APPARATUS

(71) Applicant: CANON KABUSHIKI KAISHA, Tokyo (JP)

(72) Inventors: Junichi Goda, Kashiwa (JP); Yasushi Shinto, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/876,314

(22) Filed: Jan. 22, 2018

(65) Prior Publication Data

US 2018/0210849 A1    Jul. 26, 2018

(30) Foreign Application Priority Data

Jan. 26, 2017 (JP) .............................. JP2017-012541

(51) Int. Cl.
  *G06F 13/30* (2006.01)
  *G06F 13/16* (2006.01)
  *G06F 13/364* (2006.01)
  *H04N 1/40* (2006.01)
  *G06F 13/18* (2006.01)
  (Continued)

(52) U.S. Cl.
  CPC .......... *G06F 13/30* (2013.01); *G06F 13/1605* (2013.01); *G06F 13/1657* (2013.01); *G06F 13/18* (2013.01); *G06F 13/364* (2013.01); *H04N 1/40* (2013.01); *G06F 13/34* (2013.01); *G06F 13/362* (2013.01); *G06F 15/167* (2013.01)

(58) Field of Classification Search
  CPC .... G06F 13/30; G06F 13/364; G06F 13/1657; G06F 13/1605; G06F 13/18; G06F 13/34; G06F 13/362; G06F 15/167; H04N 1/40
  See application file for complete search history.

(56) References Cited

U.S. PATENT DOCUMENTS 5,784,569 A    7/1998 Miller et al.
6,058,450 A    5/2000 Laberge
(Continued)

FOREIGN PATENT DOCUMENTS

CN    101312533 A    11/2008
CN    102306046 A    1/2012
(Continued)

OTHER PUBLICATIONS

Extended European Search Report issued in European Appln. No. 18150139.6 dated Jul. 2, 2018.
(Continued)

*Primary Examiner* — Nimesh G Patel
(74) *Attorney, Agent, or Firm* — Rossi, Kimms & McDowell LLP

(57) ABSTRACT

To accomplish this, this memory access system monitors a use-memory-bandwidth which indicates a total of memory bandwidths used between a memory and a plurality of masters, and determines whether the use-memory-bandwidth is equal to or larger than the first threshold. Based on the above-described determination result, this memory access system also restricts access to the memory by a master of low priority out of the plurality of masters.

23 Claims, 20 Drawing Sheets

(51) Int. Cl.
  *G06F 13/362* (2006.01)
  *G06F 13/34* (2006.01)
  *G06F 15/167* (2006.01)

(56) References Cited

U.S. PATENT DOCUMENTS

| | | | |
|---|---|---|---|
| 9,760,507 B2 | 9/2017 | Gyobu | |
| 2001/0011356 A1* | 8/2001 | Lee | G06F 1/3203 |
| | | | 713/322 |
| 2005/0240707 A1 | 10/2005 | Hayashi | |
| 2008/0250415 A1* | 10/2008 | Illikkal | G06F 9/5077 |
| | | | 718/103 |
| 2009/0077257 A1* | 3/2009 | Savoor | H04L 41/0681 |
| | | | 709/232 |
| 2010/0115167 A1 | 5/2010 | Tardieux et al. | |
| 2011/0055443 A1* | 3/2011 | Watanabe | G11C 11/406 |
| | | | 710/240 |
| 2013/0254444 A1 | 9/2013 | Gyobu | |
| 2014/0237148 A1* | 8/2014 | Gyobu | G06F 13/364 |
| | | | 710/110 |
| 2015/0378424 A1* | 12/2015 | Anyuru | G06F 1/3234 |
| | | | 713/320 |
| 2018/0027058 A1* | 1/2018 | Balle | H03M 7/40 |
| | | | 709/226 |
| 2018/0077081 A1* | 3/2018 | Lauer | H04L 47/50 |
| 2018/0270499 A1* | 9/2018 | Symes | H04N 19/52 |
| 2020/0267070 A1* | 8/2020 | Williams | H04L 47/822 |

FOREIGN PATENT DOCUMENTS

| | | |
|---|---|---|
| CN | 104821887 A | 8/2015 |
| JP | 2005316608 A | 11/2005 |
| JP | 2009043089 A | 2/2009 |
| JP | 2009075942 A | 4/2009 |
| JP | 2011095967 A | 5/2011 |
| JP | 2014160341 A | 9/2014 |
| WO | 9812646 A1 | 3/1998 |

OTHER PUBLICATIONS

Office Action issued in Japanese Appln No. 2017-012541 dated Jan. 4, 2021.
Office Action issued in Chinese Appln. No. 201810062812.7 dated Apr. 20, 2021.
Office Action issued in Chinese Application No. 201810062812.7 dated Aug. 4, 2020. English translation provided.

* cited by examiner

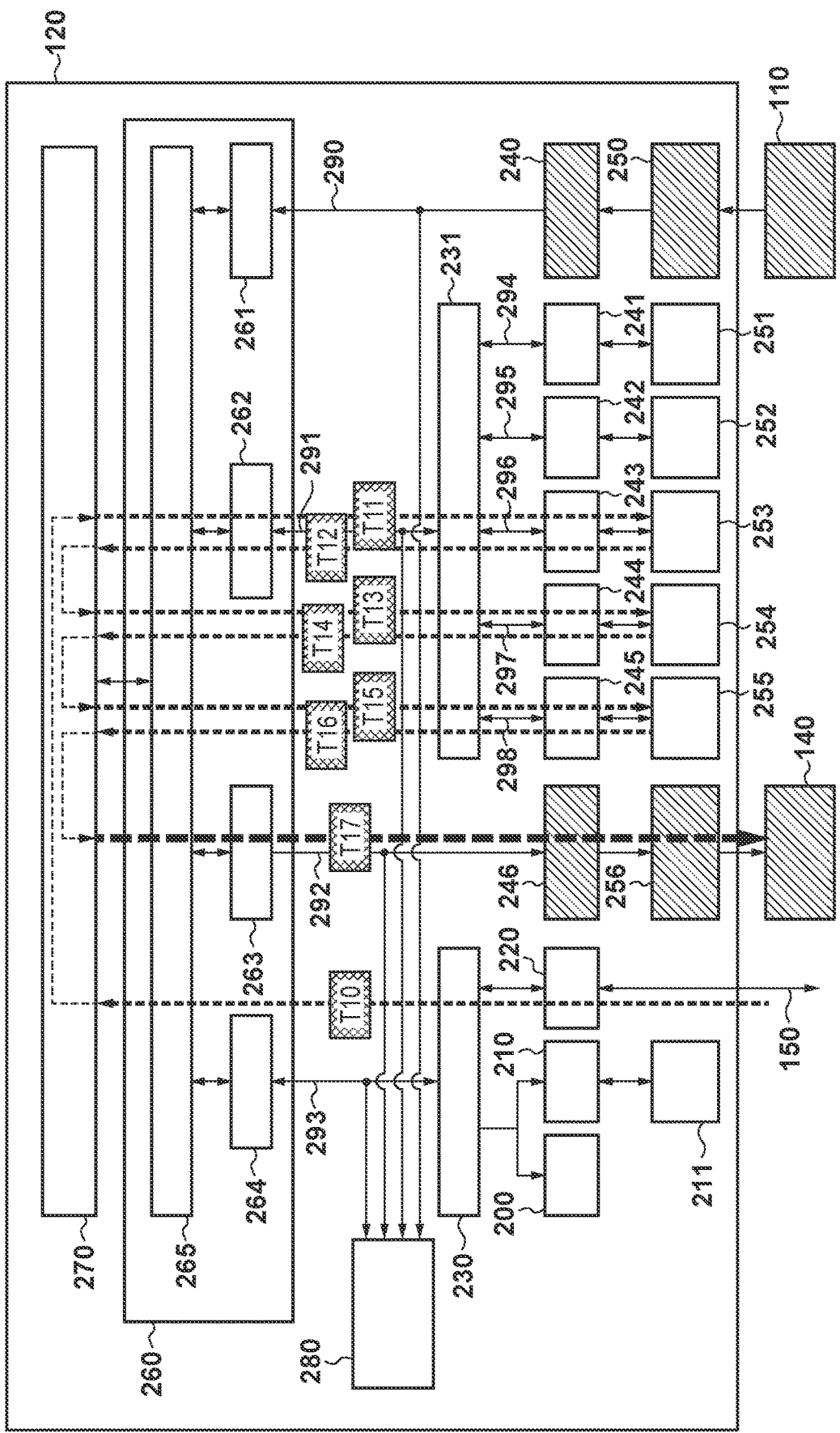

FIG. 4A

MEMORY BANDWIDTH (BANDWIDTH THAT CAN BE OUTPUT BY RAM 270)

| EXAMPLE | MEMORY OPERATING FREQUENCY [MHz] | MEMORY BUS WIDTH [bit] | MEMORY EFFICIENCY | MEMORY BANDWIDTH [MB/s] |
|---|---|---|---|---|
| MEMORY BANDWIDTH EXAMPLE 1 | 1066 | 32 | 25% | 1066 |
| MEMORY BANDWIDTH EXAMPLE 2 | 1866 | 32 | 25% | 1866 |
| MEMORY BANDWIDTH EXAMPLE 3 | 2400 | 32 | 25% | 2400 |

F I G. 4B

BANDWIDTH REQUIRED OF SCAN IMAGE PATH (IMAGE PATH AT T1 OF FIG. 3A)

| EXAMPLE | RESOLUTION | NUMBER OF PIXELS PER PAGE (A4) [Mpix] | WIDTH PER component [bit] | NUMBER OF components | ipm | PORTION OTHER THAN IMAGE TRANSFER (SHEET INTERVAL ETC) | BANDWIDTH REQUIRED OF SCAN IMAGE PATH [MB/s] |
|---|---|---|---|---|---|---|---|
| MEMORY BANDWIDTH EXAMPLE 1 | 600dpi | 35 | 8 | 3 | 30 | 25% | 70 |
| MEMORY BANDWIDTH EXAMPLE 2 | 600dpi | 35 | 8 | 3 | 100 | 25% | 233 |

FIG. 4C

BANDWIDTH REQUIRED OF PRINT IMAGE PATH (IMAGE PATH AT T17 OF FIG. 3B)

| EXAMPLE | RESOLUTION | NUMBER OF PIXELS PER PAGE (A4) [Mpix] | WIDTH PER component [bit] | NUMBER OF components | ppm | PORTION OTHER THAN IMAGE TRANSFER (SHEET INTERVAL ETC) | BANDWIDTH REQUIRED OF PRINT IMAGE PATH [MB/s] |
|---|---|---|---|---|---|---|---|
| MEMORY BANDWIDTH EXAMPLE 1 | 600dpi | 35 | 8 | 3 | 30 | 25% | 70 |
| MEMORY BANDWIDTH EXAMPLE 2 | 600dpi | 35 | 8 | 3 | 100 | 25% | 233 |
| MEMORY BANDWIDTH EXAMPLE 3 | 1200dpi | 140 | 8 | 3 | 30 | 25% | 280 |
| MEMORY BANDWIDTH EXAMPLE 4 | 1200dpi | 140 | 8 | 3 | 100 | 25% | 933 |

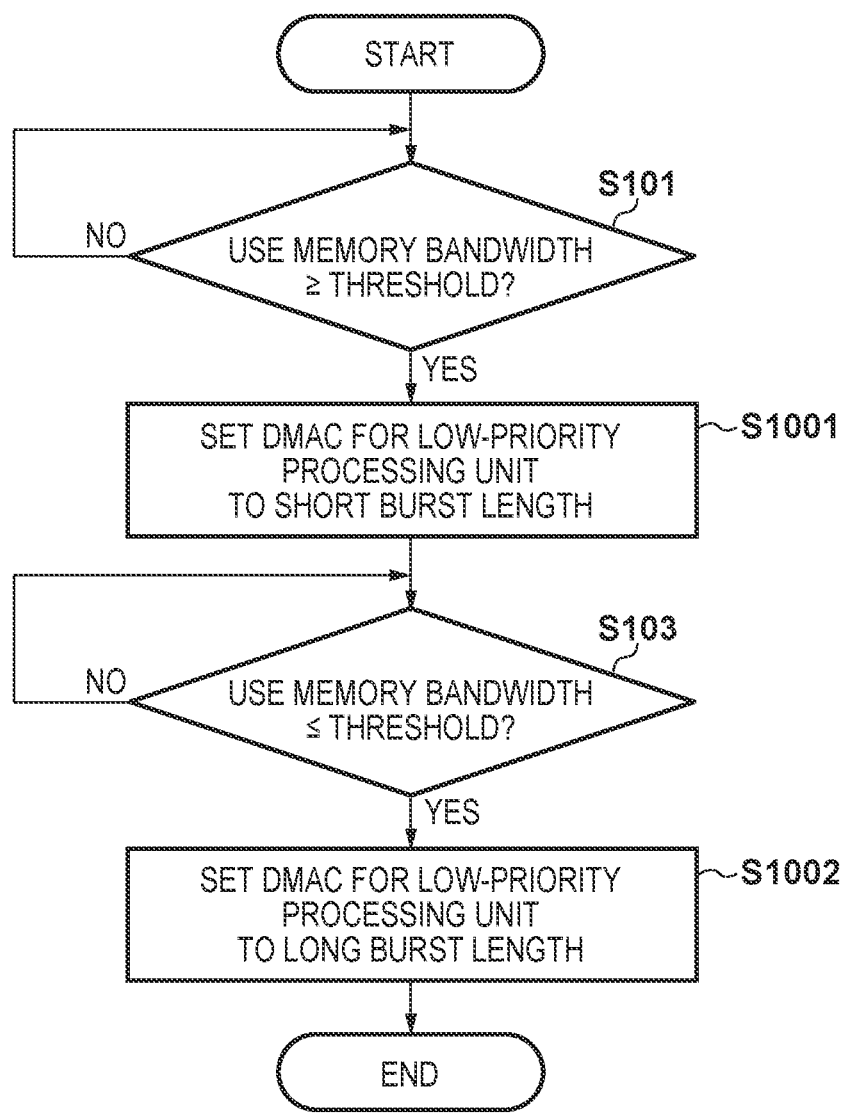

MEMORY ACCESS SYSTEM, METHOD FOR CONTROLLING THE SAME, COMPUTER-READABLE STORAGE MEDIUM, AND IMAGE FORMING APPARATUS

BACKGROUND OF THE INVENTION

Field of the Invention

The present invention relates to a memory access system, a method for controlling the same, a computer-readable storage medium, and an image forming apparatus.

Description of the Related Art

Existing image forming apparatuses each of which includes a memory access system include a digital multi function peripheral having various functions such as a scanner function, a printer function, a copy function, a network function, and a FAX transmission/reception functions. Function operations in the digital multi function peripheral are generally controlled by an image input/output control unit referred to as a controller.

In such a controller, a CPU and a plurality of function processing units that implement the above-described functions are integrated in one chip in order to attain a cost reduction. The work memory of the CPU and a main memory for performing image data transfer that implements the above-described functions are further integrated, increasing a data access amount to the main memory greatly. Increasing speeds of scan performance and print performance are also given as a factor of increasing the data access amount to the main memory. In particular, processing such as scan and print requires a real-time property incapable of stopping an operation until at least completion of the input/output of a page under processing once the operation is started. That is, it is desirable that while always guaranteeing a constant transfer bandwidth for access to the main memory with respect to image processing which requires real-time processing, the controller also operates a non-real-time processing function in parallel as much as possible. In other words, the controller needs to perform control so as not to cause a situation in which the transfer bandwidth for access to the main memory with respect to the image processing which requires the real-time processing cannot be guaranteed. It is therefore necessary to use memories with a high frequency/multi-bit width capable of sufficiently guaranteeing memory transfer performance even if all the functions are operated and to ensure sufficient memory transfer performance.

However, using the memory with the high frequency leads to increases in cost and power consumption of the memory, and using the memory with the multi-bit width leads to an increase in cost of the unit price of a chip by increasing the number of pins of the chip. To cope with this, there is an invention that monitors a transfer bandwidth between the main memory and a real-time processing function unit or a non-real-time processing function unit, and controls memory access in order to ensure the transfer bandwidth to the main memory of the real-time processing function while restraining the memories from having the high frequency and the multiple bits.

For example, Japanese Patent Laid-Open No. 2014-160341 proposes a technique of controlling so as not to accept access from a non-real-time processing function unit if a preset transfer bandwidth is nearly exceeded. This makes it possible to suppress a bandwidth by controlling so as not to accept transfer of a non-real-time processing unit in a state in which all real-time processing units operate, and a use-memory-bandwidth of a main memory is increased, and to guarantee the transfer bandwidth in real-time processing.

Moreover, Japanese Patent Laid-Open No. 2009-75942 proposes a technique of shortening a data transfer unit from each of a real-time processing function unit and a non-real-time processing function unit, and releasing a bus use right for each of the shortened data transfer units for access from each processing function unit in accordance with a transfer bandwidth. This makes it possible to guarantee the transfer bandwidth in real-time processing even if transfer operations of the real-time processing unit and the non-real-time processing unit occur simultaneously.

The above related art, however, poses the following problem. For example, in the above related art, the transfer bandwidth is suppressed if the transfer bandwidth of the non-real-time processing unit nearly exceeds a given threshold even in a state in which the main memory is not accessed intensively. In addition, the bus use right in a short data transfer unit is released even in the state in which the main memory is not accessed intensively. In these cases, it is likely that memory transfer performance of the main memory cannot be used completely.

A memory represented by an SDRAM or the like implements high-speed data transfer to the memory by burst transfer that transfers data of subsequent addresses continuously just by designating one address, making it possible to improve memory transfer performance by prolonging a burst length. However, if the burst lengths of all processing units that access the main memory are prolonged, the amount of data transferred to the main memory and a period of time during which each processing unit occupies the main memory increase.

SUMMARY OF THE INVENTION

One aspect of the present invention enables realization of a mechanism for controlling so as to ensure a bandwidth required of a real-time processing unit while monitoring a use-memory-bandwidth used by a memory and utilizing transfer performance of the memory.

One aspect of the present invention provides a memory access system comprising: a memory; a plurality of masters that access the memory; a processor that monitors a use-memory-bandwidth which indicates a total of memory bandwidths used between the memory and the plurality of masters, and determines whether the monitored use-memory-bandwidth is not less than a first threshold; and a memory controller that restricts access to the memory by a master of low priority out of the plurality of masters if the processor determines that the use-memory-bandwidth is not less than the first threshold.

Another aspect of the present invention provides a memory access system comprising: a memory; a plurality of masters that access the memory; a processor that monitors a use-memory-bandwidth which indicates a total of memory bandwidths used between the memory and the plurality of masters; and a memory controller that determines whether the use-memory-bandwidth monitored by the processor is not less than a first threshold and restricts access to the memory by a master of low priority out of the plurality of masters if determining that the use-memory-bandwidth is not less than the first threshold.

Still another aspect of the present invention provides a method for controlling a memory access system that includes a memory and a plurality of masters that access the memory, the method comprising executing: monitoring a use-memory-bandwidth which indicates a total of memory bandwidths used between the memory and the plurality of masters; determining whether the use-memory-bandwidth monitored in the monitoring is not less than a first threshold; and performing memory access control of restricting access to the memory by a master of low priority out of the plurality of masters if it is determined in the determining that the use-memory-bandwidth is not less than the first threshold.

Still yet another aspect of the present invention provides a non-transitory computer-readable storage medium storing a computer program for causing a computer to execute respective steps in a method for controlling a memory access system that includes a memory and a plurality of masters that access the memory, wherein the method executes monitoring a use-memory-bandwidth which indicates a total of memory bandwidths used between the memory and the plurality of masters, determining whether the use-memory-bandwidth monitored in the monitoring is not less than a first threshold, and performing memory access control of restricting access to the memory by a master of low priority out of the plurality of masters if it is determined in the determining that the use-memory-bandwidth is not less than the first threshold.

Yet still another aspect of the present invention provides an image forming apparatus comprising: a memory access system; an image processing unit that executes image processing; a scanner that reads an image from an original; and a printer that forms an image on a recording medium, wherein the memory access system comprises a memory; a plurality of masters that access the memory; a processor that monitors a use-memory-bandwidth which indicates a total of memory bandwidths used between the memory and the plurality of masters, and determines whether the monitored use-memory-bandwidth is not less than a first threshold; and a memory controller that restricts access to the memory by a master of low priority out of the plurality of masters if the processor determines that the use-memory-bandwidth is not less than the first threshold.

Further features of the present invention will be apparent from the following description of exemplary embodiments with reference to the attached drawings.

BRIEF DESCRIPTION OF THE DRAWINGS

FIGS. 3A-3E show views showing image path control of the controller unit according to the embodiment;

FIGS. 4A-4C show tables showing bandwidth examples according to the embodiment;

FIG. 10 is a control flowchart for bandwidth control according to the embodiment;

FIGS. 11A-1 and 11A-2 are timing charts pertaining to RAM control according to the embodiment; and FIGS. 11B-1 and 11B-2 are timing charts pertaining to RAM control according to the embodiment.

DESCRIPTION OF THE EMBODIMENTS

Figure 1:
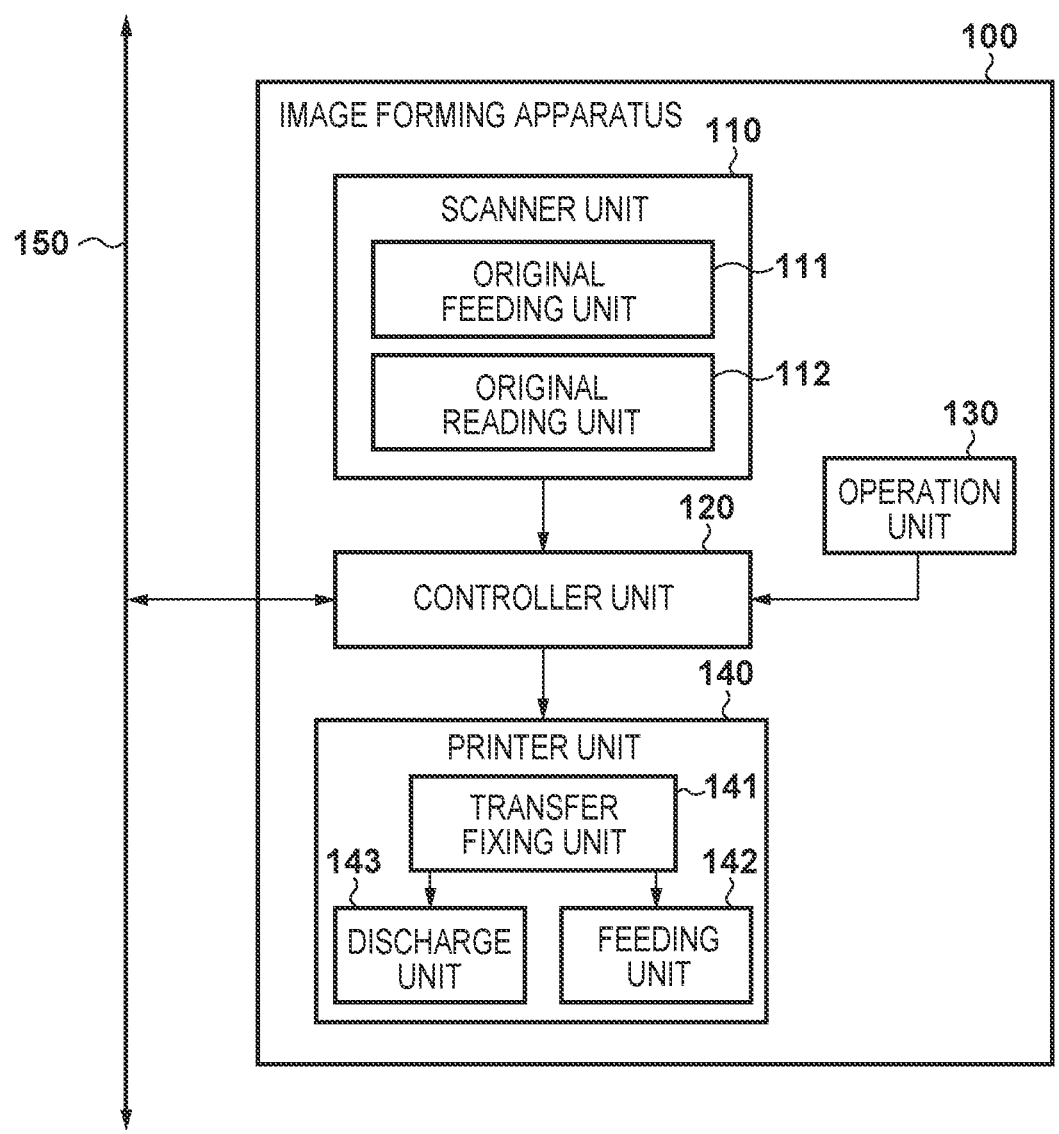
FIG. 1 is a block diagram showing an image forming apparatus according to an embodiment

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Arrangement of Image Forming Apparatus>

The first embodiment of the present invention will be described below. First, an example of the arrangement of an image forming apparatus 100 according to this embodiment will be described with reference to FIG. 1. Note that in this embodiment, a description will be given by taking the image forming apparatus as an example of a memory access system. Note that the present invention will not be limited to the image forming apparatus. That is, the present invention is applicable to any apparatus including a characteristic memory access system to be described below.

The image forming apparatus 100 includes a scanner unit 110, a controller unit 120, an operation unit 130, and a printer unit 140. The scanner unit 110 optically reads an original image and converts it into image data. Moreover, the scanner unit 110 includes an original reading unit 112 having a function of reading an original and an original feeding unit 111 having a function of conveying an original sheet. The printer unit 140 conveys recording paper, prints image data on the paper as a visible image, and discharges the printed image to the outside of the apparatus. The printer unit 140 includes a feeding unit 142 that includes a plurality of types of recording paper cassettes, a transfer fixing unit 141 having a function of transferring and fixing image data to recording paper, and a discharge unit 143 having a function of sorting and stapling the recording paper that has undergone printing, and then outputting it to the outside of the apparatus.

The controller unit 120 is electrically connected to the scanner unit 110 and the printer unit 140, and further connected to a network 150 such as a LAN, an ISDN, the Internet/intranet, or the like. The controller unit 120 provides a copy function of controlling the scanner unit 110 to read original image data and controlling the printer unit 140 to output the image data to a recording sheet.

The controller unit 120 also provides a scanner function of converting the image data read from the scanner unit 110 into code data and transmitting it to a host computer (not shown) via the network 150. The controller unit 120 further provides a printer function of converting the code data received from the host computer via the network 150 into image data and outputting it to the printer unit 140. The controller unit 120 still further provides a FAX reception function of receiving data from the ISDN to print and a FAX transmission function of transmitting scanned data to the ISDN. These processes of scan, print, and FAX transmission/reception will be referred to as jobs, and the image forming apparatus 100 controls/processes these jobs in accordance with an instruction from an operator. The operation unit 130 is connected to the controller unit 120, formed by a liquid crystal touch panel, and provides a user interface for operating the image forming apparatus 100.

<Arrangement of Controller Unit>

Figure 2:
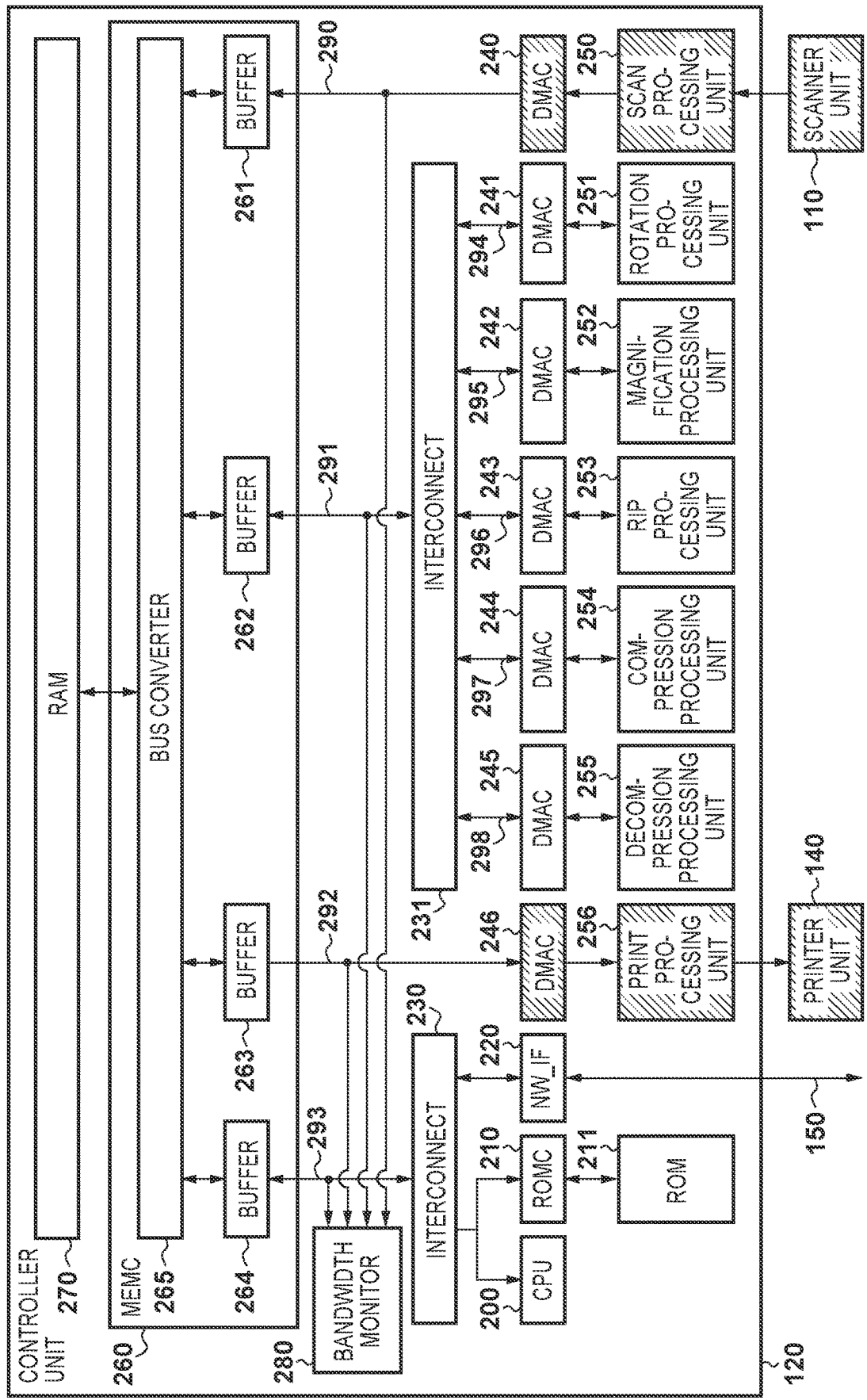
FIG. 2 is a block diagram showing a controller unit according to the embodiment.

An example of the arrangement of the controller unit 120 according to this embodiment will be described next with reference to FIG. 2. The respective internal blocks of the controller unit 120 will be described in detail.

The controller unit 120 includes a CPU 200, a ROMC 210, a ROM 211, a network IF (NW_IF) 220, interconnects 230 and 231, DMACs 240 to 246, a scan processing unit 250, a rotation processing unit 251, a magnification processing unit 252, a RIP processing unit 253, a compression processing unit 254, a decompression processing unit 255, a print processing unit 256, an MEMC 260, a RAM 270, and a bandwidth monitor 280. The CPU (Central Processing Unit) 200 is a processor that controls an entire system.

The CPU 200 generally controls processing related to the jobs of print processing and scan processing in accordance with an OS or control programs loaded into the RAM 270. The ROMC 210 is a control module (ROM controller) for accessing the ROM 211 that stores a boot program of the system. When the image forming apparatus 100 is turned on, the CPU 200 accesses the ROM 211 via the ROM controller 210 and boots the system. The RAM 270 is a system work memory for operating the CPU 200 and is also an image memory for storing image data temporarily. In this embodiment, the RAM 270 is formed by an SDRAM as an example.

The MEMC 260 is a control module (Memory controller) for accessing the RAM 270 that stores the control programs and image data of the system. The MEMC 260 includes a register for setting or controlling the RAM 270, and this register can be accessed from the CPU 200. The detail arrangement of the MEMC 260 will be described later.

The network IF 220 is a processing unit which is connected to the network 150 and inputs/outputs information such as image data to/from an external host computer. The interconnects 230 and 231 connect the CPU 200 and the respective processing units, and the MEMC 260.

Each of the DMACs 240 to 246 functions as a memory access control unit and is a DMA (Direct Memory Access) controller serving as a memory access master that accesses the RAM 270 via the MEMC 260. The DMACs 240 to 246 perform data transfer between the respective processing units 250 to 256 and the RAM 270 to be described later. Each of the DMACs 240 to 246 is controlled by the CPU 200, and has a function of controlling a read/write operation for a specific memory address and a timing to perform DMA transfer. Each of the DMACs 240 to 246 has a function of controlling so as not to issue an image transfer request to the memory by a setting from the CPU 200, a detail of which will be described later in this embodiment.

The CPU 200 also generally controls the scan processing unit 250, the rotation processing unit 251, the magnification processing unit 252, the RIP processing unit 253, the compression processing unit 254, the decompression processing unit 255, and the print processing unit 256 to be described below. In a description of each processing unit, image data refers to an uncompressed image, and compressed image data refers to an image compressed by some compression method.

In accordance with a setting set by the CPU 200, the scan processing unit 250 performs image processing such as shading correction processing, MTF correction processing, input gamma correction, or filter processing on image data input from the scanner unit 110 and outputs the image data to the DMAC 240. In accordance with a setting set by the CPU 200, the rotation processing unit 251 performs rotation processing at 90°, 180°, or 270° on image data input from the DMAC 241, and outputs the image data to the DMAC 241. In accordance with a setting set by the CPU 200, the magnification processing unit 252 magnifies image data input from the DMAC 242 into an arbitrary magnification such as ½ or ¼ and outputs the image data to the DMAC 242. In accordance with a setting set by the CPU 200, the RIP processing unit 253 performs rendering processing on a PDL image input from the DMAC 243 and outputs image data to the DMAC 243.

In accordance with a setting set by the CPU 200, the compression processing unit 254 performs image compression processing such as JPEG or JBIG on image data input from the DMAC 244 and outputs compressed image data to the DMAC 244. In accordance with a setting set by the CPU 200, the decompression processing unit 255 performs decompression processing on JPEG or JBIG compressed image data input from the DMAC 245 and outputs decompressed image data to the DMAC 245. In accordance with a setting set by the CPU 200, the print processing unit 256 performs image processing such as color space conversion processing, filter processing, or halftone processing on image data input from the DMAC 246 and outputs the image data to the printer unit 140.

Buses 290 to 298 between the MEMC, and the DMACs and interconnects described so far are connected by AXI_BUS or the like serving as a standard bus.

The internal arrangement of the MEMC 260 will be described next. Buffers 261 to 264 temporarily buffer transmission data and reception data to/from the respective DMACs and interconnects. Each of the buffers 261 to 264 has at least a buffer size capable of burst transfer at once by the buses 290 to 293. Each of the buffers 261 to 264 also serves as an asynchronous buffer when the operating frequencies of the buses 290 to 293 and the operating frequency of a bus converter are different. A bus converter 265 has an arbitration function of arbitrating the access rights of the buffers 261 to 264 in a round-robin manner and performs conversion into a protocol for accessing the RAM 270.

The bandwidth monitor 280 monitors the transfer data amounts of the buses 290 to 293 and calculates the total bandwidth of transfer data. The total bandwidth refers to a use-memory-bandwidth for the RAM 270. The calculated use-memory-bandwidth can be read out from the CPU 200. It is possible to set a bandwidth threshold from the CPU 200, and it is also possible to detect whether the use-memory-bandwidth is equal to or larger than the set threshold or whether the total bandwidth is equal to or smaller than the set threshold. A detail will be described later with reference to a detailed block diagram of the bandwidth monitor 280 in FIG. 5.

<Image Path and Access Control>

Image paths in this embodiment and how image data transfer is suppressed when this embodiment is applied will be described next with reference to FIGS. 3A and 3B. Here, the image paths refer to the flows of image data inside the controller unit 120. Note that entities related to transmission/reception and transfer of image data are respective blocks that pass through arrows shown in FIGS. 3A-3E.

First, a premise in describing FIGS. 3A-3E will be described. When an image is transferred between the respective image processing units, image data is transferred via the RAM 270 without exception. A thick arrow shown in each view indicates an image path that requires real-time processing (to be referred to as a real-time image path hereinafter), and thin arrows indicate image paths that require non-real-time processing (to be referred to as non-real-time image paths hereinafter). The real-time image paths in this embodiment include a path which starts the input of image data from the scanner unit 110 to the RAM 270 and transfers the image data to the RAM 270, and a path which transfers the image data stored in the RAM 270 to the printer unit 140.

The scanner unit 110 reads an original image, and thus cannot stop reading halfway once it starts it. Therefore, the controller unit 120 needs to continue transferring image data of a predetermined amount to the RAM 270 without stopping when the input of image data from the scanner unit 110 to the controller unit 120 is started. On the other hand, the printer unit 140 cannot stop printing halfway once it starts printing. It is therefore necessary to read out image data of a predetermined amount from the controller unit 120 to the RAM 270 at all times and output it to the printer unit 140 when the controller unit 120 starts to output image data to the printer unit 140. As described above, a path that needs to continue performing image data transfer decided in a predetermined time at all times serves as the real-time image path.

Examples of the image paths in this embodiment and image transfer control at the time of data transfer access contention to the RAM 270 in this embodiment will now be described with reference to FIGS. 3A-3E. More specifically, a method for suppressing image data transfer when memory access is congested at the time of the data transfer access contention, and the use-memory-bandwidth of the RAM 270 nearly exceeds the substantial transfer bandwidth of the RAM 270 will be described.

Figure 3A:
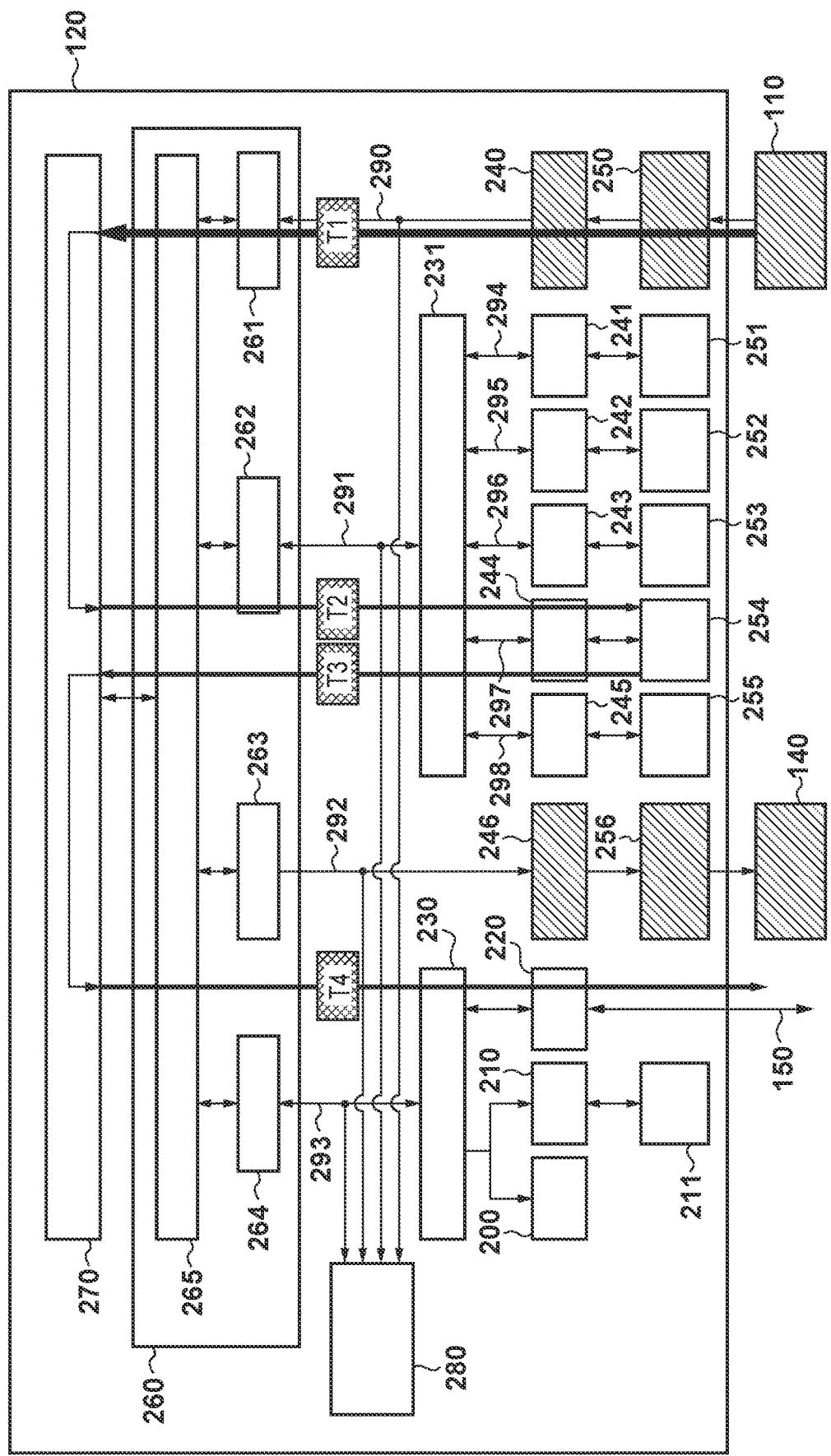

FIG. 3A is the example of the image paths when a SEND job is executed, and the paths are indicted by solid arrows. The SEND job is a job of compressing image data read from the scanner unit 110 and transferring it to a PC or server (not shown) connected onto the network 150. At T1, the image data read from the scanner unit 110 is spooled to the RAM 270. Subsequently, the image data spooled at T1 is transferred from the RAM 270 to the compression processing unit 254 and undergoes image compression such as JPEG at T2, and compressed image data is spooled from the compression processing unit 254 to the RAM 270 at T3. Subsequently, at T4, the compressed image data spooled at T3 is transferred from the RAM 270 onto the network via the network IF 220.

FIG. 3B is the example of the image paths when a PDL_PRINT job is executed, and the image paths are indicated by broken arrows. The PDL_PRINT job is a job of receiving print data for performing print processing from the PC (not shown) connected onto the network 150 and outputting the data to the printer unit 140 to print. At T10, PDL data is received from the network via the network IF 220 and spooled to the RAM 270. Subsequently, the PDL data spooled at T10 is transferred from the RAM 270 to the RIP processing unit 253 and undergoes rendering processing at T11, and image data is spooled from the RIP processing unit 253 to the RAM 270 at T12.

Then, the image data spooled at T12 is transferred from the RAM 270 to the compression processing unit 254 and undergoes image compression such as JBIG at T13, and compressed image data is spooled from the compression processing unit 254 to the RAM 270 at T14. Subsequently, the compressed image data spooled at T14 is transferred from the RAM 270 to the decompression processing unit 255 and undergoes image decompression at T15, and the decompressed image data is spooled from the decompression processing unit 255 to the RAM 270 at T16. At T17, the image data spooled at T16 is read out from the RAM 270 and output to the printer unit 140.

Figure 3C:
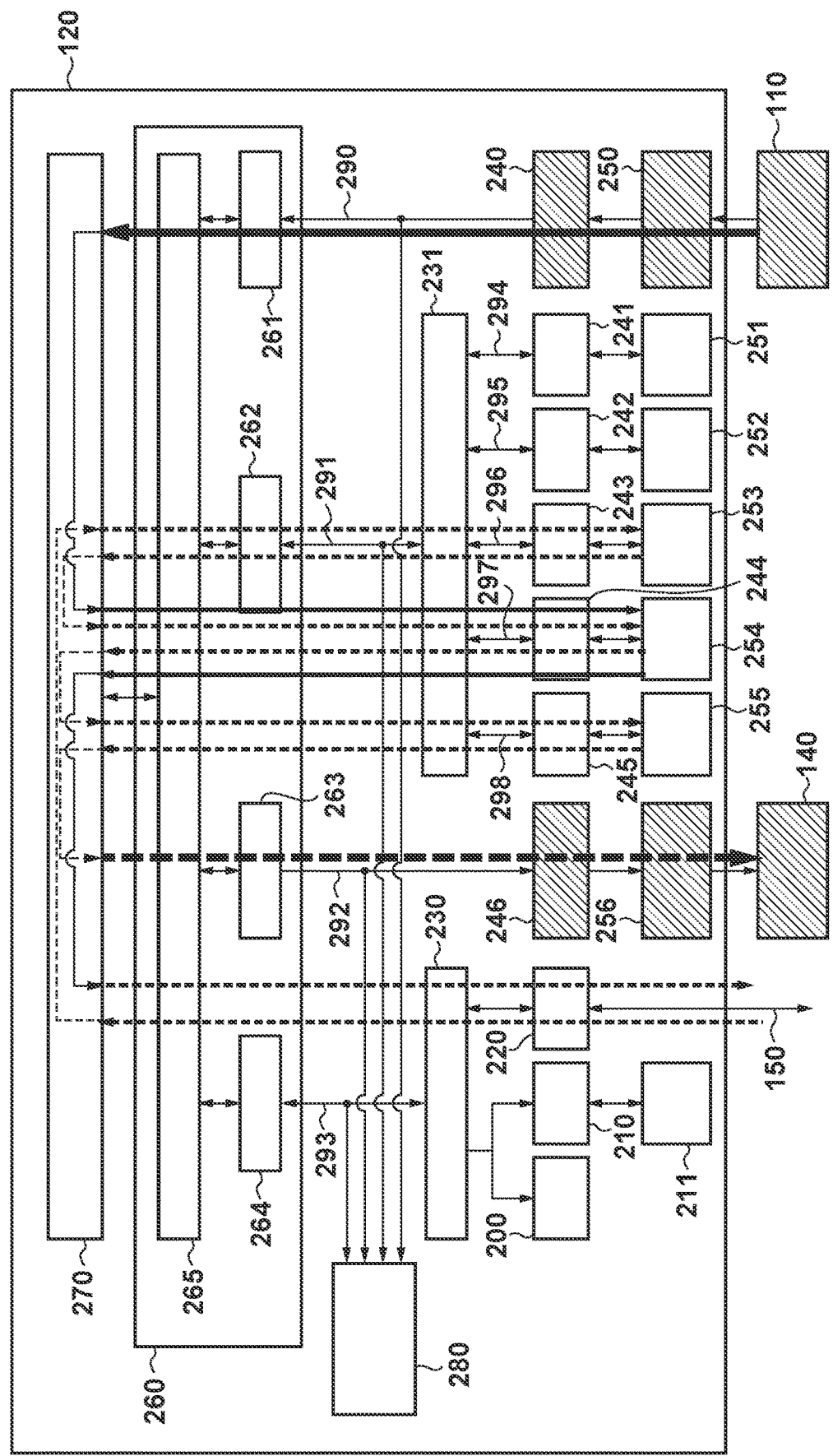

FIG. 3C is the example of the image paths when the SEND job and the PDL_PRINT job shown in FIGS. 3A and 3B described above are executed simultaneously. The image paths have been described with reference to FIGS. 3A and 3B, and thus a description thereof will be omitted. When the SEND job and the PDL_PRINT job thus contend with each other, the operating image paths increase as a matter of course, increasing the data transfer amount to the RAM 270, that is, the use-memory-bandwidth.

Figure 3D:
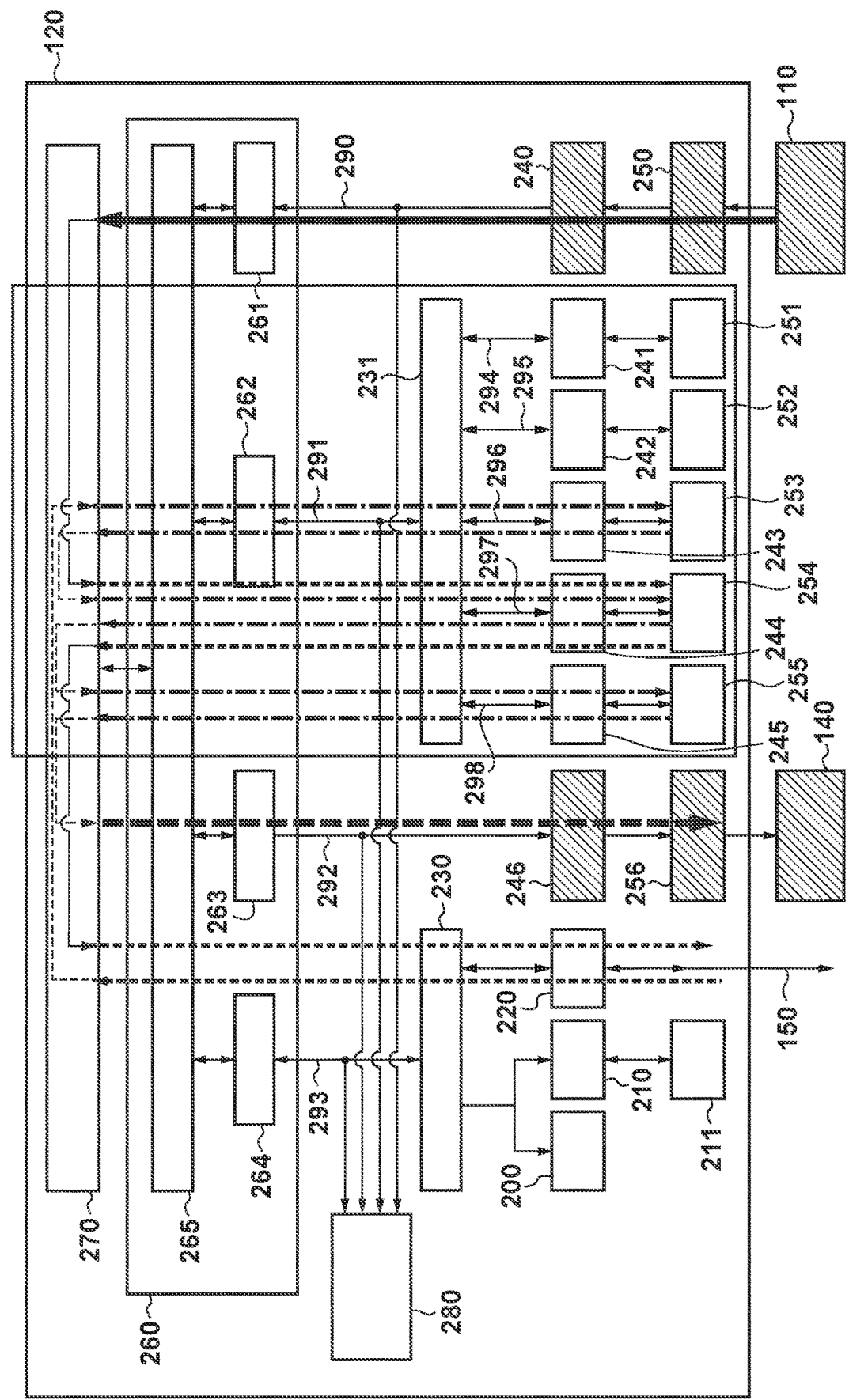

If the use-memory-bandwidth of the RAM 270 increases and exceeds a possible transfer bandwidth of the RAM 270, the scan image path (T1) and print image path (T17) of the real-time image paths cannot satisfy a required transfer bandwidth. In such a situation, the controller unit 120 fails as a system. Therefore, in order to avoid such a situation, in this embodiment, control is performed so as to pause data transfer of the non-real-time image paths if the use-memory-bandwidth in the RAM 270 nearly exceeds the possible transfer bandwidth of the RAM 270, as shown in FIG. 3D. More specifically, this is implemented by causing the CPU 200 to use the bandwidth monitor 280 to control the DMACs 241 to 245. Such control guarantees that the controller unit 120 does not fail as the system.

Figure 3E:
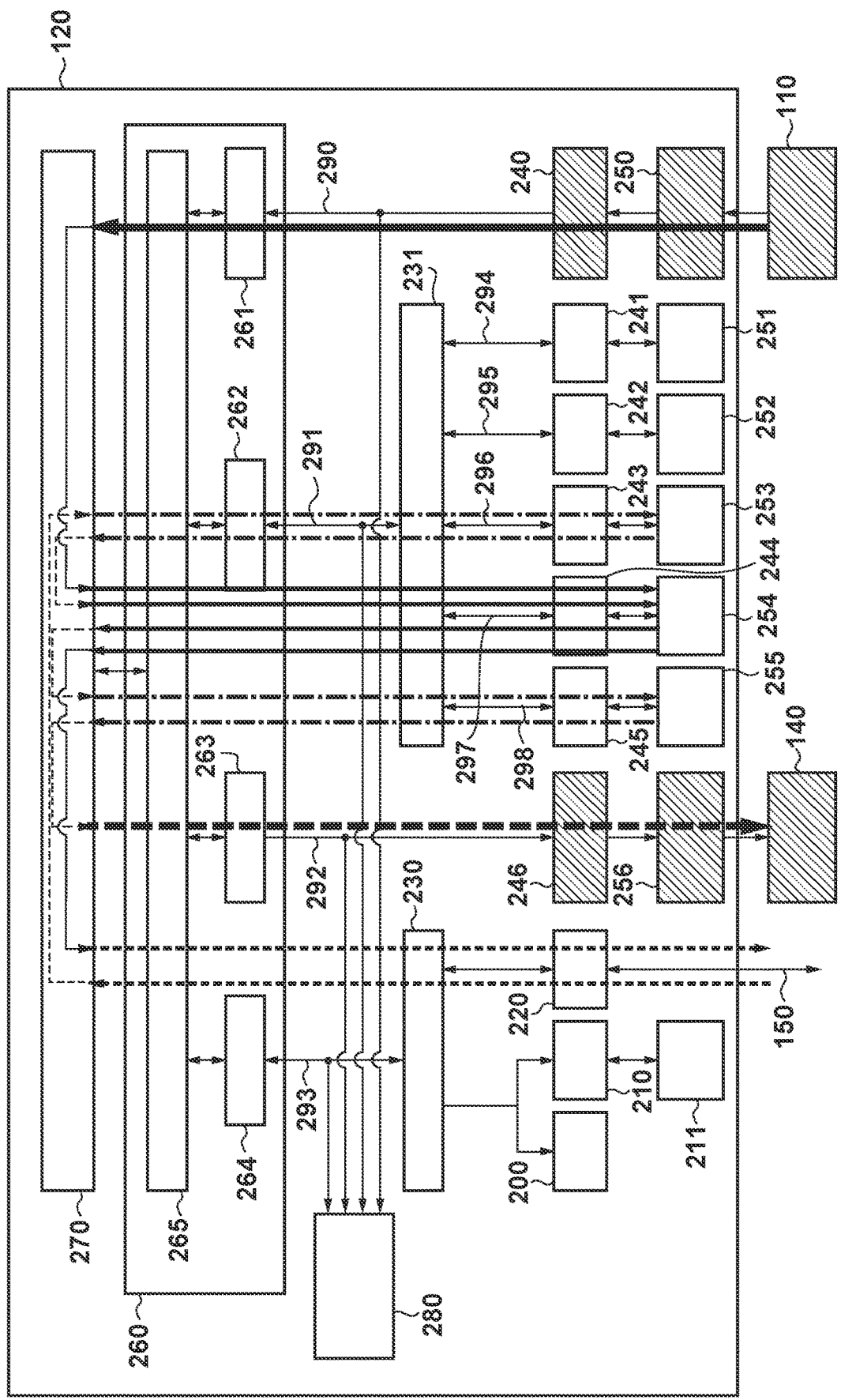

As shown in FIG. 3E, if the possible transfer bandwidth of the RAM 270 is high to some extent, it is also possible to control, by the CPU 200, only some of the non-real-time image paths so as to be accessed by the RAM 270. In this embodiment, an operation assumes a case in which the SEND job is processed preferentially as much as possible while guaranteeing transfer bandwidths required of the real-time image paths. However, the present invention is not limited to this and may be controlled so as to process another process preferentially depending on the specifications, settings, or the like of the apparatus.

<Transfer Bandwidth>

The possible transfer bandwidth of the RAM 270, and bandwidths required of the scan image path (T1) and the print image path (T17) described with reference to FIGS. 3A-3E will be described in detail next with reference to FIGS. 4A-4C.

FIG. 4A shows the possible transfer bandwidth (memory bandwidth) of the RAM 270. A calculation method thereof is given by:

$$\text{memory bandwidth } [NB/s] = \text{memory operating frequency } [MHz] * \text{memory } bus \text{ width } [bit] * \text{memory efficiency } [\%]/8 \quad (1)$$

wherein the memory operating frequency is the operating frequency of the RAM 270, the memory bus width is the number of bits of the bus width of a data transfer signal between the MEMC 260 and the RAM 270, and the memory efficiency is actual transfer efficiency between the MEMC 260 and the RAM 270. The transfer efficiency changes by the access pattern to the RAM 270.

FIG. 4B shows the bandwidth required of the scan image path (T1 of FIG. 3A). A calculation method thereof is given by:

$$\text{bandwidth required of scan image path} = (\text{number of pixels } per \text{ page} * \text{bit width } per \text{ component} * \text{number of components}) * (ipm/60) * (1/1 - \text{proportion other than image transfer})/8 \quad (2)$$

wherein the number of pixels per page is the number of pixels per page of an original to be scanned. For example, the number of pixels in A4 size of 600 [dpi] is about 35 [Mpixel]. Component will be described by taking an example. For example, if image data transferred by the scan processing unit 250 to the RAM 270 is an RGB image, and the number of tones per color is 256, the bit width per component is 8-bit width, and the number of components is three because there are three colors. Alternatively, if the number of tones of image data output by the scan processing unit 250 is 1,024, the bit width per component is 10 bits. Furthermore, image identification information such as characters/photos is output in addition to the RGB image data, the number of components is 4 in RGB*image identification information. ipm represents reading performance of the scanner unit 110 and indicates the number of originals per minute the scanner unit 110 can scan and read out. The proportion other than image transfer represents the proportion of a time other than a time in which an image is transferred actually when the image is input from the scanner unit 110.

FIG. 4C shows the bandwidth required of the print image path (T17 of FIG. 3B). A calculation method thereof is given by:

bandwidth required of print image path=(number of pixels *per* page*bit width *per* component*number of components)*(*ppm*/60)* (1/1−proportion other than image transfer)/8     (3)

A difference in calculation method from equation (2) is only ipm and ppm, and ppm represents the number of printable sheets (recording media) per minute. Another variable and the like are the same as in equation (2), and thus a description thereof will be omitted.

As described above, the RAM 270 needs to guarantee at least the scan reading speed and print output speed of the image forming apparatus 100, and select a memory having a memory bandwidth in which at least the CPU and the like can operate.

A concrete description will be given by using examples of FIGS. 4A-4C, assuming that scan performance uses scan bandwidth example 2 in FIG. 4B, and print performance uses print bandwidth example 4 in FIG. 4C. In this case, at least 1,166 [MB/s] obtained by adding 233 [MB/s] of a bandwidth required of scan processing and 933 [MB/s] of a bandwidth required of print processing is needed as a memory bandwidth. More specifically, 1166+α [MB/s] is needed as the memory bandwidth because a bandwidth in which at least the CPU 200 and the like can operate needs to be guaranteed at a minimum. α is a memory bandwidth used by the CPU 200.

Hence, when the controller unit 120 can operate scan processing and print processing simultaneously, a memory which has the memory operating frequency of 1,066 [MHz] in memory bandwidth example 1 shown in FIG. 4A only outputs 1,066 [MB/s], and thus cannot be selected. Therefore, in this embodiment, at least a memory which has the memory operating frequency of 1,866 [MHz] and performance of 1,866 [MB/s] in memory bandwidth example 2 in FIG. 4A needs to be selected. An extra bandwidth can be assigned to the non-real-time image paths, increasing a possibility of being able to operate the non-real-time image paths as well if a memory having a higher operating frequency is selected.

An arrangement and sequence for implementing an operation in FIG. 3D will be described in detail below.

<Arrangement of Bandwidth Monitor>

An example of the arrangement of the bandwidth monitor 280 according to this embodiment will be described next with reference to FIG. 5. The respective internal blocks will be described in detail. The bandwidth monitor 280 includes a bandwidth calculation unit 300, bandwidth threshold setting units 310 and 311, and bandwidth threshold detection units 320 and 321.

The bandwidth calculation unit 300 is used to measure the use-memory-bandwidth of the RAM 270. More specifically, the bandwidth calculation unit 300 monitors data transfer of the buses 290, 291, 292, and 293, and calculates the current use-memory-bandwidth of the RAM 270. The use-memory-bandwidth calculated by the bandwidth calculation unit 300 can be read from the CPU 200. The bandwidth calculation unit 300 also outputs the calculated use-memory-bandwidth to the bandwidth threshold detection units 320 and 321 via a signal line. Note that in FIG. 5, the buses 290 to 293 are conceptually indicated by arrows. This indicates that the bandwidth monitor 280 monitors the buses 290 to 293 and obtains information.

Figure 5:
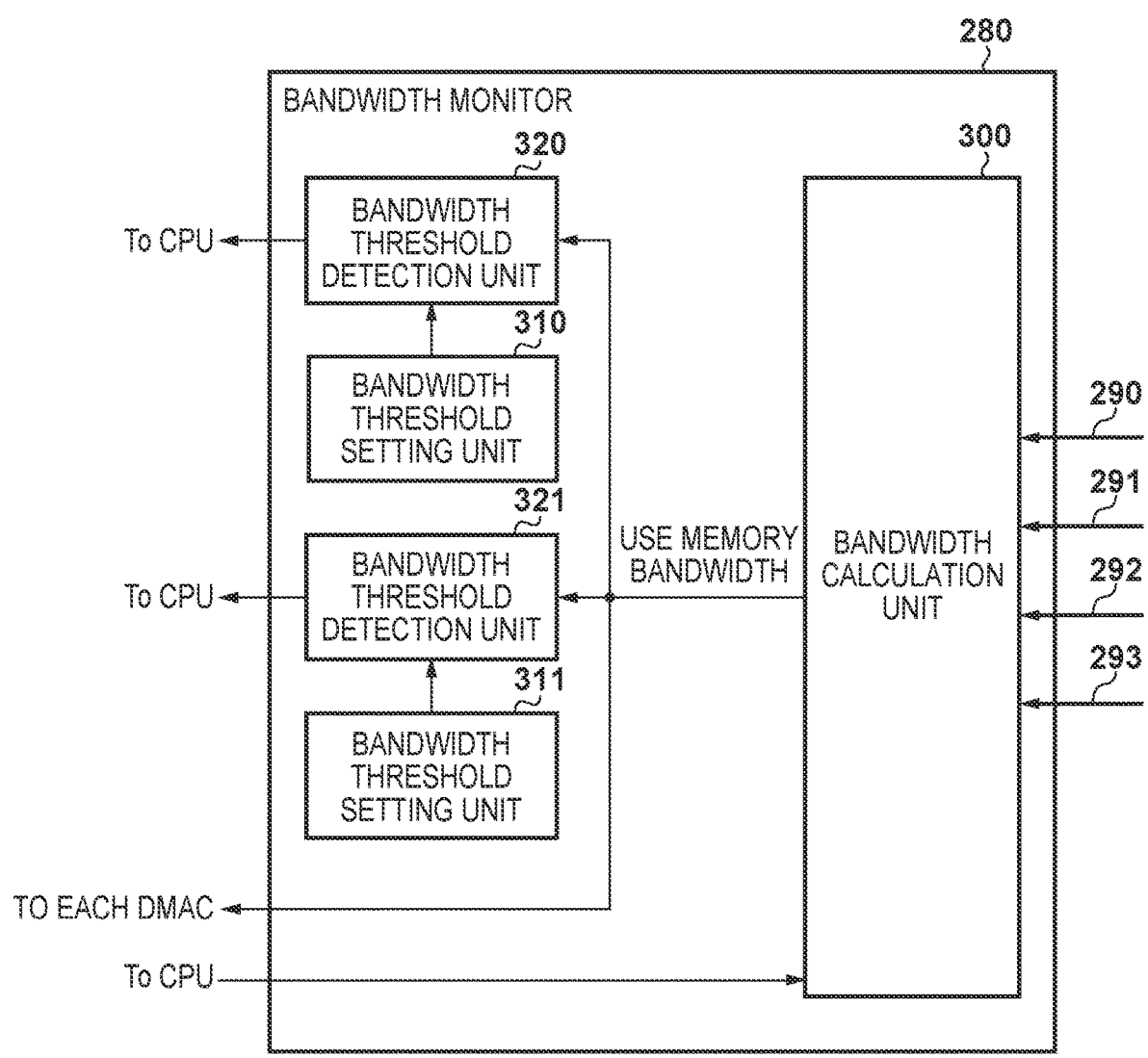
FIG. 5 is a block diagram showing a bandwidth monitor according to the embodiment.

Moreover, in FIG. 5, a use-memory-bandwidth calculated from the bandwidth calculation unit 300 to each DMAC is output. This is an arrangement in the second embodiment to be described below, and thus a description thereof will be omitted.

The bandwidth threshold setting units 310 and 311 can set bandwidth thresholds by the CPU 200. The thresholds set in the bandwidth threshold setting units 310 and 311 are used for comparison with the current use-memory-bandwidth of the RAM 270 measured by the bandwidth calculation unit 300.

The bandwidth threshold detection units 320 and 321 compare the current use-memory-bandwidth calculated by the bandwidth calculation unit 300 with the thresholds set in the bandwidth threshold setting units 310 and 311, and notify the CPU 200 of a comparison result. A notification condition can be set from the CPU 200, and a condition setting can be one of a case in which the use-memory-bandwidth calculated by the bandwidth calculation unit 300 exceeds the thresholds set in the bandwidth threshold setting units 310 and 311, and a case in which the use-memory-bandwidth falls below the thresholds set in the bandwidth threshold setting units 310 and 311. This bandwidth monitor 280 allows the CPU 200 to know the current use-memory-bandwidth of the RAM 270. Note that in this embodiment, only two bandwidth threshold setting units and two bandwidth threshold detection units are provided. If a plurality of conditions are to be made, however, an arrangement may be adopted in which three or more bandwidth threshold setting units and three or more bandwidth threshold detection units are provided.

Arrangement Example of DMAC

An arrangement example of each of the DMACs 241 to 245 according to this embodiment will be described next with reference to FIG. 6. The respective internal blocks will be described in detail. All the DMACs 241 to 245 are controlled by the CPU 200. Each of the DMACs 241 to 245 includes a transmission buffer 400, a WRITE_DMAC 410, a reception buffer 420, a READ_DMAC 430, and a transfer permission setting unit 450.

The transmission buffer 400 and the WRITE_DMAC 410 are used when data is transferred from each image processing unit to the RAM 270 (written in the RAM 270). The reception buffer 420 and the READ_DMAC 430 are used when data is transferred from the RAM 270 to each image processing unit (read out from the RAM 270).

The transmission buffer 400 is a buffer that temporarily holds data input from each image processing unit. The WRITE_DMAC 410 is a controller that performs data transfer for writing data in the RAM 270. The WRITE_D-MAC 410 confirms whether data transferred at once, including burst transfer data, is stored in the transmission buffer 400, and transfers image data to the buses 294 to 298 if the data is stored.

The reception buffer 420 is a buffer that temporarily holds data input from the READ_DMAC 430. When the reception buffer 420 holds the data, data is transferred to each image processing unit. The READ_DMAC 430 confirms whether there is a free space, in the reception buffer 420, for storing data received at once including burst transfer data, and outputs readout requests to the buses 294 to 298 and receives image data if there is the free space.

The transfer permission setting unit 450 is a setting unit to perform control to set a state capable of performing data transfer of the WRITE_DMAC 410 and the READ_DMAC 430 or to stop the data transfer, and is set by the CPU 200. The WRITE_DMAC 410 and the READ_DMAC 430 can make a data transfer request if an Enable signal output by the transfer permission setting unit 450 is enabled. On the other hand, the WRITE_DMAC 410 and the READ_DMAC 430 cannot make the data transfer request if the Enable signal is disabled. For example, each of the buses 294 to 298 is AXI_BUS in this embodiment, and thus controlled so as not to assert a VALID signal from a write address channel and a read address channel.

<Processing Sequence>

Figure 7:
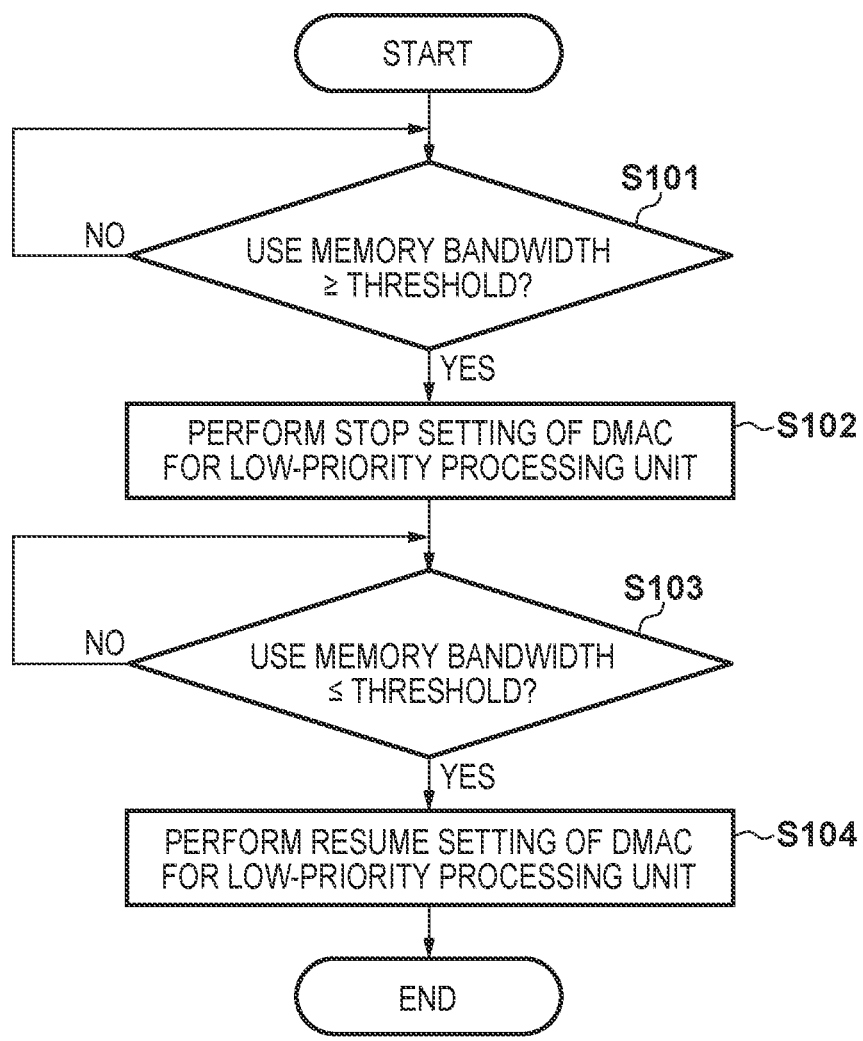
FIG. 7 is a control flowchart for bandwidth control according to the embodiment.

A processing sequence for controlling a bandwidth suppression method according to a use-memory-bandwidth of a memory in this embodiment will be described next with reference to FIG. 7. Processing to be described below is implemented by, for example, causing the CPU 200 to load control programs stored in the ROM 211 into the RAM 270 and execute them.

In step S101, the CPU 200 determines whether a use-memory-bandwidth monitored by the bandwidth monitor 280 becomes equal to or larger than a threshold. If the use-memory-bandwidth does not become equal to or larger than the threshold, a determination in step S101 is performed repeatedly. If the use-memory-bandwidth becomes equal to or larger than the threshold, the process advances to step S102. A method for determining whether the use-memory-bandwidth becomes equal to or larger than the threshold can be detected by a notification from the bandwidth threshold detection unit 320 in the bandwidth monitor 280. This threshold is the memory bandwidth shown in FIG. 4A, and preset in the bandwidth threshold setting units 310 and 311.

In step S102, the CPU 200 performs a stop setting on the transfer permission setting unit 450 of each of the DMACs 241 to 245 used in the non-real-time image path for low-priority processing because the use-memory-bandwidth becomes equal to or larger than the threshold. With the stop setting, the DMACs 241 to 245 operate so as not to make data transfer requests, and the use-memory-bandwidth of the RAM 270 decreases, making it possible to control so as not to exceed the memory bandwidth described in FIG. 4A.

In step S103, the CPU 200 determines whether the use-memory-bandwidth monitored by the bandwidth monitor 280 becomes equal to or smaller than the threshold. If the threshold does not become equal to or smaller than the threshold, a determination in step S103 is performed repeatedly. If the use-memory-bandwidth becomes equal to or smaller than the threshold, the process advances to step S104. A method for determining whether the use-memory-bandwidth becomes equal to or smaller than the threshold is detected by a notification from the bandwidth threshold detection unit 321 in the bandwidth monitor 280.

In step S104, the CPU 200 performs a permission setting on the transfer permission setting unit 450 of each of the DMACs 241 to 245 used in the non-real-time image path because the use-memory-bandwidth becomes equal to or smaller than the threshold. With the permission setting, the DMACs 241 to 245 can make data transfer requests. That is, an access restriction to the memory performed in step S102 is canceled here.

For example, a value set in the bandwidth threshold setting unit 311 is set to a value slightly smaller than the memory bandwidth described in FIG. 4A. In this case, processing in which the use-memory-bandwidth becomes equal to or smaller than the threshold in step S103 immediately after the data transfer of the DMACs 241 to 245 stops in step S102, and the DMACs 241 to 245 resume the data transfer in step S104 is repeated. Alternatively, a value set in the bandwidth threshold setting unit 311 is set to a value much smaller than the memory bandwidth described in FIG. 4A. In this case, the operation that the setting of the transfer permission setting unit 450 is performed frequently as in the case in which the value set in the bandwidth threshold setting unit 311 is set to the value slightly smaller than the memory bandwidth described in FIG. 4A need not be performed.

This embodiment is implemented by only two thresholds. As described with reference to FIG. 5, however, it is also possible to provide the plurality of bandwidth threshold setting units 310 and bandwidth threshold detection units 320. By preparing a plurality of thresholds, the CPU 200 controls each of the DMACs 241 to 245 to stop/resume in accordance with a corresponding one of the thresholds, making it possible to implement an operation described in FIG. 3E. This modification is also applicable to the second and third embodiments to be described later.

A more concrete description will be given by taking an example. For example, three bandwidth threshold setting units 310 are provided, and three thresholds for a value exceeding 1,866 [MB/s], a value falling below 1,500 [MB/s], and a value falling below 1,200 [MB/s] are set, respectively. The thresholds of the respective DMACs 241 to 245 detected in step S101 are 1,866 [MB/s] in common. On the other hand, 1,500 [MB/s] is used for the DMAC 244, and 1,200 [MB/s] is used for the DMACs 241, 242, 243, and 245 as the thresholds detected in step S103.

In this case, 1,866 [MB/s] is exceeded first when the state in FIG. 3C is set, and thus the state in FIG. 3D is set to stop all the DMACs 241 to 245 temporarily. When this state is set, the use-memory-bandwidth is reduced soon, and then falls below 1,500 [MB/s]. When this state is set, only the DMAC 244 can operate. When the value falls below 1,200 [MB/s] in this state, the other DMACs 241 to 243 and 245 also start to operate. When the value does not fall below 1,200 [MB/s], a situation is obtained in which the state in FIG. 3E is held.

Note that as a modification, the bandwidth threshold setting unit 310 and the bandwidth threshold detection unit 320 to detect a use-memory-bandwidth of a memory that stops or resumes each DMAC processing may be included, and a setting value that can be controlled for each DMAC may be set. This allows the respective DMACs 241 to 245 to operate as if they were given priority. This modification is also applicable to the second and third embodiments to be described later.

As described above, the memory access system according to this embodiment monitors a use-memory-bandwidth indicating the total of the memory bandwidths used between the memory and a plurality of masters, and determines whether the use-memory-bandwidth is equal to or larger than the first threshold by the CPU. In addition, this memory access system restricts, based on the determination by the CPU described above, access to the memory by a master of low priority out of the plurality of masters. Thus, in this embodiment, the memory bandwidth used by the RAM 270 is monitored, and control is performed so as not to make a memory access request from the non-real-time processing unit to the RAM 270 only when the possible memory bandwidth of the RAM 270 is nearly exceeded. According to this embodiment, this makes it possible to guarantee the transfer bandwidth of the real-time processing unit while using an available bandwidth of the RAM 270 at a maximum, that is, ensuring a situation capable of also using the non-real-time processing unit as much as possible.

Second Embodiment

The second embodiment of the present invention will be described below. In the above-described first embodiment, when the use-memory-bandwidth of the RAM 270 nearly reaches a memory bandwidth, the CPU 200 is notified of a monitoring result by the bandwidth monitor 280 and controls the DMACs 241 to 245, guaranteeing the bandwidths of the real-time image paths. In the above-described first embodiment, the CPU 200 performs control after the memory bandwidth reaches the threshold, taking a short time until the stop setting of the transfer permission setting units 450 of the DMACs 241 to 245 is made finally. The threshold of the memory bandwidth may be exceeded during a short time. It is therefore necessary to set a threshold set in the bandwidth threshold setting unit 310 with a small margin.

On the other hand, this embodiment is different from the above-described first embodiment in that transfer permission setting units 450 of DMACs 241 to 245 are not set by a CPU 200 but perform control with hardware in the DMACs 241 to 245. The stop setting of each transfer permission setting unit 450 can be performed immediately by performing control with the hardware, making it possible to use a memory transfer bandwidth to the upper limit of a memory bandwidth. Thus, as shown in FIG. 5, in this embodiment, each of the DMACs 241 to 245 is notified of a use-memory-bandwidth calculated by a bandwidth calculation unit 300. The DMACs 241 to 245 control access to a RAM 270 of each master based on the notified use-memory-bandwidth.

<Arrangement of DMAC>

Figure 8:
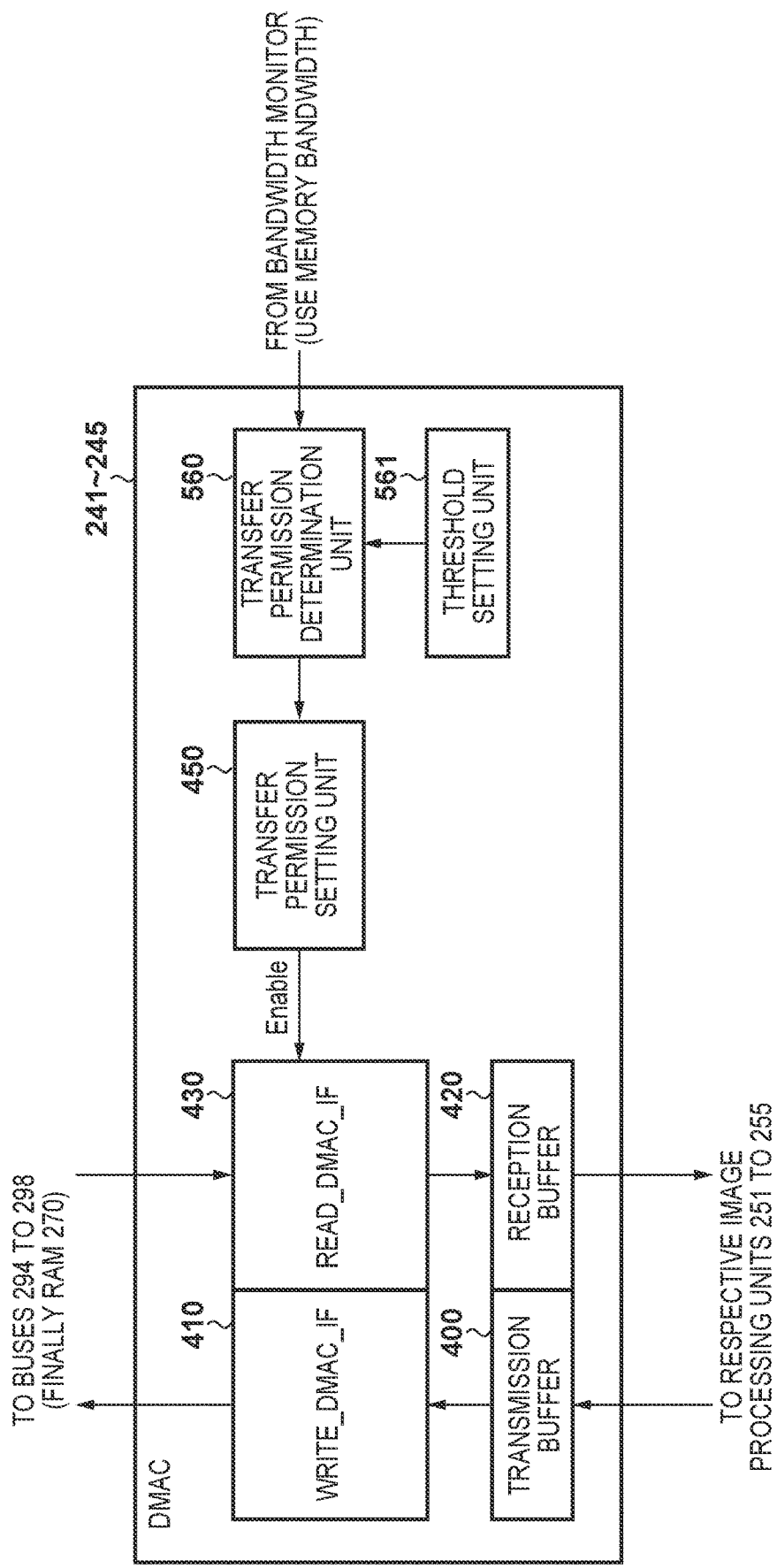
FIG. 8 is a block diagram showing DMACs according to an embodiment.

An arrangement example of each of the DMACs 241 to 245 according to this embodiment will be described with reference to FIG. 8. The respective internal blocks will be described in detail. All the DMACs 241 to 245 are controlled by the CPU 200. As in the arrangement of FIG. 6 described in the first embodiment above, each of the DMACs 241 to 245 includes a transmission buffer 400, a WRITE_DMAC 410, a reception buffer 420, a READ_DMAC 430, and a transfer permission setting unit 450. Each of the DMACs 241 to 245 according to this embodiment further includes a transfer permission determination unit 560 and a threshold setting unit 561.

The transmission buffer 400, the WRITE_DMAC 410, the reception buffer 420, and the READ_DMAC 430 have the same arrangements as those described with reference to FIG. 6, and thus a description thereof will be omitted. A difference from the above-described first embodiment shown in FIG. 6 will mainly be described below.

A signal line for the bandwidth calculation unit 300 of a bandwidth monitor 280 to calculate a use-memory-bandwidth is connected between an MEMC 260 and each of the DMACs 241 to 245. The threshold setting unit 561 can be set by the CPU 200 and sets a threshold to be compared with the use-memory-bandwidth calculated by the bandwidth calculation unit 300. The transfer permission determination unit 560 compares the value of the threshold setting unit 561 with the use-memory-bandwidth calculated by the bandwidth calculation unit 300 and determines to perform a stop setting if the use-memory-bandwidth is equal to or larger than the threshold set in the threshold setting unit 561. On the other hand, the transfer permission determination unit 560 determines to perform a permission setting if the use-memory-bandwidth is smaller than the threshold set in the threshold setting unit 561. The transfer permission setting unit 450 is notified of the determination result.

The transfer permission setting unit 450 has the same arrangement as in the above-described first embodiment only except that it is controlled not by the CPU 200 but in accordance with the determination result by the transfer permission determination unit 560.

In this embodiment, a certain threshold is set in the threshold setting unit 561, and the transfer permission determination unit 560 performs the stop/permission setting of the transfer permission setting unit depending on whether the use-memory-bandwidth is equal to or larger than the threshold, or smaller than the threshold. As in the above-described first embodiment, however, an arrangement may be adopted in which a transfer stop setting is performed if a use-memory-bandwidth exceeds a certain threshold, and a transfer permission setting is performed if the use-memory-bandwidth falls below the certain threshold.

An example of a setting for performing operations shown in FIGS. 3C-3E when the arrangement of this embodiment is adopted will be described here. For example, a description for performing the same operation as in the description of the flowchart in FIG. 7 will be given.

A threshold on which the stop setting is performed in the threshold setting unit 561 of each of the DMACs 241 to 245 is set to 1,866 [MB/s]. 1,500 [MB/s] is set to a permission setting threshold of the DMAC 244, and 1,200 [MB/s] is set to permission setting thresholds of the DMACs 241, 242, 243, and 245. By thus setting, it becomes possible to perform the operations shown in of FIGS. 3C-3E as in the above-described first embodiment.

Another setting value may be used, as a matter of course. For example, if a threshold on which the stop setting is performed in the threshold setting unit 561 of each of the DMACs 241, 242, 243, and 245 is set to 1,500 [MB/s], a transfer bandwidth in which a DMAC 240 and a DMAC 246 operate is guaranteed, as a matter of course. In addition, it is also possible to increase a proportion in which the DMAC 244 to be processed preferentially though it is a non-real-time image path operates.

As described above, a memory access system according to this embodiment monitors a use-memory-bandwidth indicating the total of memory bandwidths used between a memory and a plurality of masters, and determines whether the use-memory-bandwidth is equal to or larger than the first threshold by a DMAC. Based on the determination result, the DMAC restricts access to the memory by a master of low priority out of the plurality of masters. Thus, in this embodiment, the transfer permission determination unit 560 serving as hardware in each of the DMACs 241 to 245 performs the transfer permission setting unit 450 of each of the DMACs 241 to 245. This allows the CPU 200 to perform the stop setting of the transfer permission setting unit 450 more immediately than the transfer permission setting unit 450. Therefore, it becomes possible to use a memory transfer bandwidth to the upper limit of a memory bandwidth more than in the above-described first embodiment.

Third Embodiment

The third embodiment of the present invention will be described below. In this embodiment, as shown in FIG. 3D, if a use-memory-bandwidth of a RAM 270 nearly exceeds a possible transfer bandwidth (memory bandwidth) of the RAM 270, control is performed so as to shorten a burst length in order to reduce a use-memory-bandwidth for data transfer of non-real-time image paths. More specifically, a CPU 200 uses a bandwidth monitor 280 to control DMACs 241 to 245, implementing the above-described control. In FIG. 3D, non-real-time image paths of a SEND job each having the shortened burst length are indicated by dotted arrows, and non-real-time image paths of a PDL_PRINT job each having the shortened burst length are indicated by arrows of alternate long and short dashed lines. By thus controlling, it is possible to guarantee that a controller unit 120 does not fail as a system.

<Arrangement of DMAC>

Figure 9:
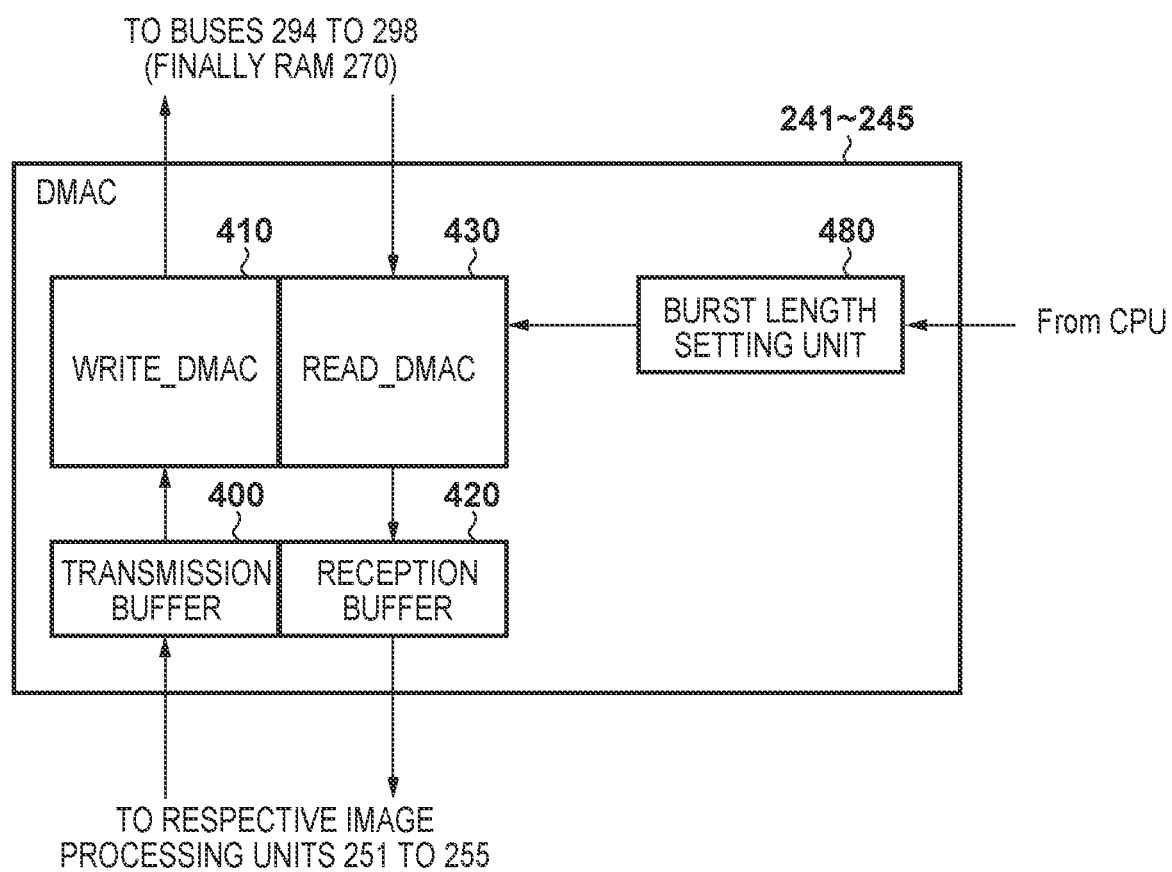
FIG. 9 is a block diagram showing DMACs according to an embodiment.

An arrangement example of each of the DMACs 241 to 245 according to this embodiment will be described next with reference to FIG. 9. The respective internal blocks will be described in detail. All the DMACs 241 to 245 are controlled by the CPU 200. Only an arrangement different from the arrangement described in the first embodiment above will be described here.

Figure 6:
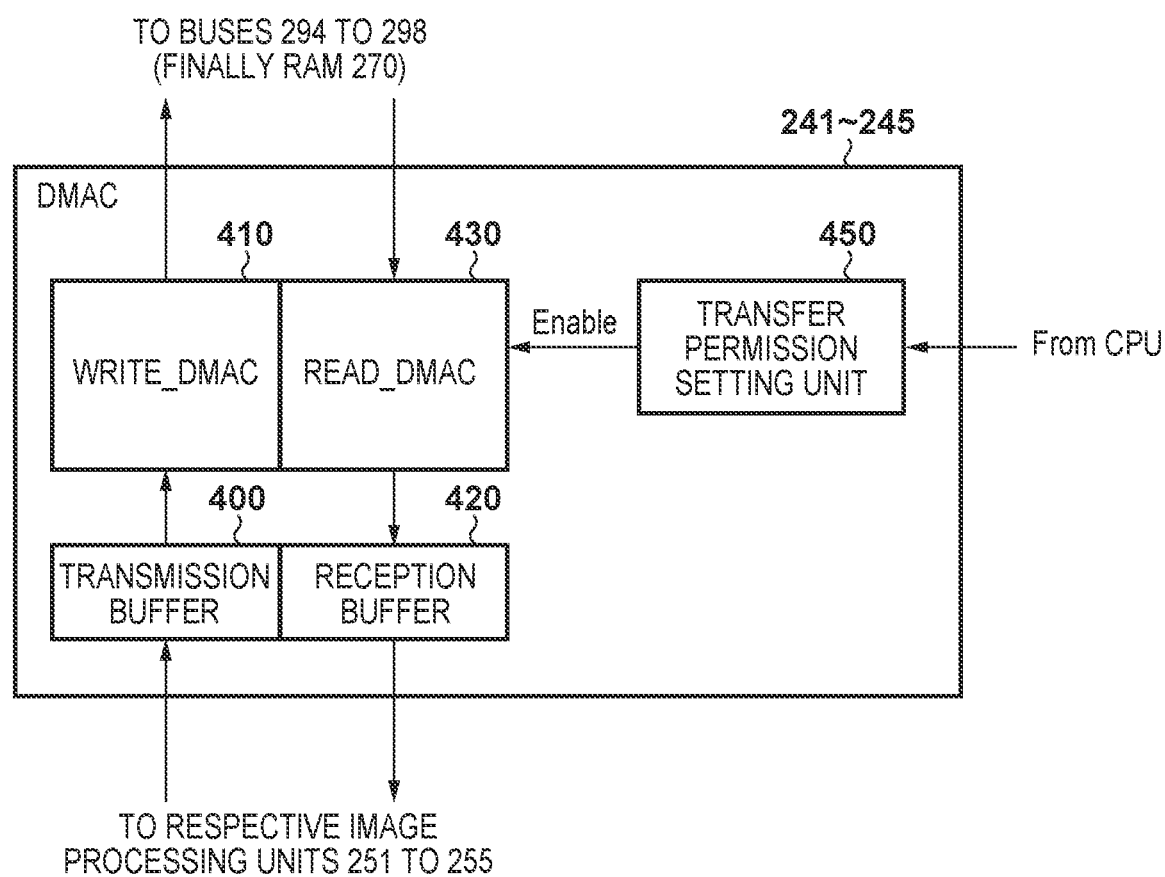
FIG. 6 is a block diagram showing DMACs according to the embodiment.

Each of the DMACs 241 to 245 according to this embodiment includes a burst length setting unit 480 in place of the arrangement of a transfer permission setting unit 450 in FIG. 6. The burst length setting unit 480 is a setting unit to control a burst length at the time of data transfer of a WRITE_DMAC 410 and a READ_DMAC 430, and set by the CPU 200. In accordance with a burst length output by the burst length setting unit 480, the WRITE_DMAC 410 and the READ_DMAC 430 output a data write request of a transmission buffer 400 and a data readout request to a reception buffer 420.

The initial value of the burst length of a DMAC is set to a settable maximum burst size. The maximum burst size is decided from a maximum burst size that can be set in the burst length setting unit 480, or a maximum burst size that can be stored by each of a buffer (one of 261 to 264) to which the DMAC accesses, the transmission buffer 400, and the reception buffer 420.

<Processing Sequence>

A processing sequence for controlling a bandwidth suppression method according to a use-memory-bandwidth of a memory in this embodiment will be described next with reference to FIG. 10. Processing to be described below is implemented by, for example, causing the CPU 200 to load control programs stored in a ROM 211 into the RAM 270 and execute them. Note that only steps different from the control of FIG. 7 described in the first embodiment above will be described here. That is, in the processing sequence, steps S1001 and S1002 are executed in place of steps S102 and S104.

In step S1001, because the use-memory-bandwidth becomes equal to or larger than a threshold, the CPU 200 performs a change setting of shortening the burst length on the burst length setting unit 480 of each of the DMACs 241 to 245 used in the non-real-time image path. With the change setting, each of the DMACs 241 to 245 operates so as to decrease a data transfer amount for a data transfer request, and the use-memory-bandwidth of the RAM 270 decreases, making it possible to control so as not to exceed the memory bandwidth described in FIG. 4A.

If the CPU 200 determines in step S103 that the use-memory-bandwidth becomes equal to or smaller than the threshold, the process advances to step S1002 in which it performs a change setting of prolonging the burst length on the burst length setting unit 480 of each of the DMACs 241 to 245 used in the non-real-time image path. With the change setting, each of the DMACs 241 to 245 operates so as to increase the data transfer amount for the data transfer request, making it possible to increase the use-memory-bandwidth of the RAM 270.

For example, a value set in a bandwidth threshold setting unit 311 may be a value slightly smaller than a memory bandwidth described in FIG. 4A. In this case, processing in which the use-memory-bandwidth becomes equal to or smaller than the threshold in step S103 immediately after the data transfer of the DMACs 241 to 245 stops in step S1001, and the DMACs 241 to 245 resume the data transfer in step S1002 is repeated. Alternatively, a value set in the bandwidth threshold setting unit 311 may be a value much smaller than the memory bandwidth described in FIG. 4A. In this case, the operation that the setting of the burst length setting unit 480 is performed frequently as in the case in which the value set in the bandwidth threshold setting unit 311 is set to the value slightly smaller than the memory bandwidth described in FIG. 4A need not be performed.

This embodiment is implemented by only two thresholds. As described with reference to FIG. 5, however, it is also possible to provide a plurality of bandwidth threshold setting units 310 and bandwidth threshold detection units 320. By preparing a plurality of thresholds, the CPU 200 controls so as to change the burst length of each of the DMACs 241 to 245 in accordance with a corresponding one of the thresholds, making it possible to implement an operation described in FIG. 3E. More specifically, three bandwidth threshold setting units 310 are provided, and three thresholds for a value exceeding 1,866 [MB/s], a value falling below 1,500 [MB/s], and a value falling below 1,200 [MB/s] are set, respectively. The initial setting value of the burst length of each DMAC is 8. The thresholds of the respective DMACs 241 to 245 detected in step S101 are 1,866 [MB/s] in common. As the thresholds detected in step S103, the DMAC 244 uses 1,500 [MB/s] and 1,200 [MB/s], and the DMACs 241, 242, 243, and 245 use only 1,200 [MB/s].

In this case, 1,866 [MB/s] is exceeded first when the state in FIG. 3C is set, and thus the state in FIG. 3D is set to change all the DMACs 241 to 245 to short burst lengths (burst length 2). When this state is set, the use-memory-bandwidth is reduced soon, and then falls below 1,500 [MB/s]. When this state is set, only the DMAC 244 is changed to a long burst length (burst length 4). When the value falls below 1,200 [MB/s] in this state, each of the DMACs 241 to 245 is changed to the maximum burst length (burst length 8). When the value does not fall below 1,200 [MB/s], a situation is obtained in which the state in FIG. 3E is held.

It becomes possible to control the use-memory-bandwidth in accordance with a bandwidth by thus changing the burst lengths stepwise in accordance with bandwidth thresholds. An example has been described in this embodiment. However, the bandwidth threshold setting unit 310 and the bandwidth threshold detection unit 320 to detect a use-memory-bandwidth of a memory that changes the burst length of each DMAC may be provided, and a setting value that can be controlled for each DMAC may be set. This allows the respective DMACs 241 to 245 to operate as if they were given priority.

<Timing Chart>

Figures 1, 11A:
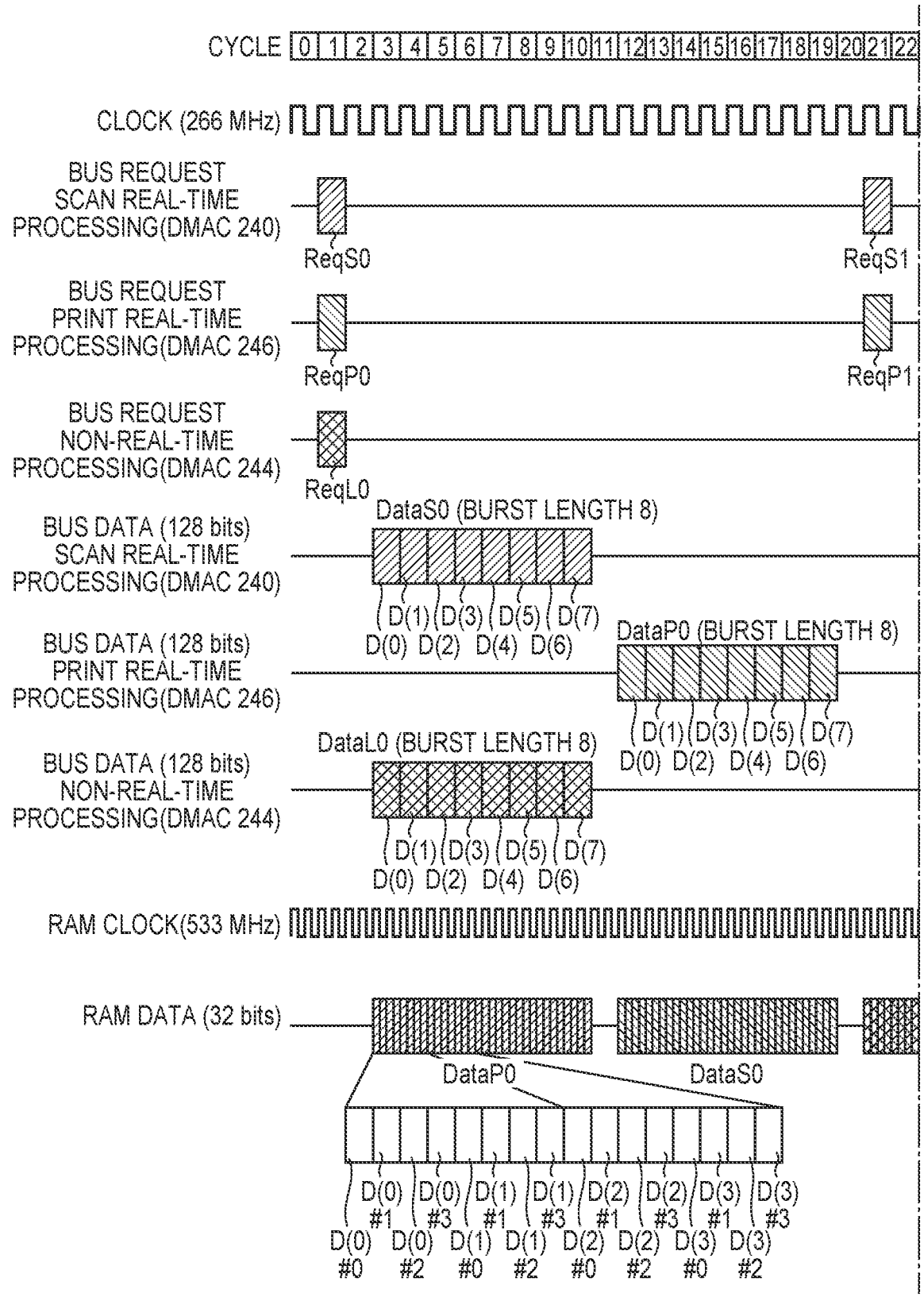
Figures 2, 11A:
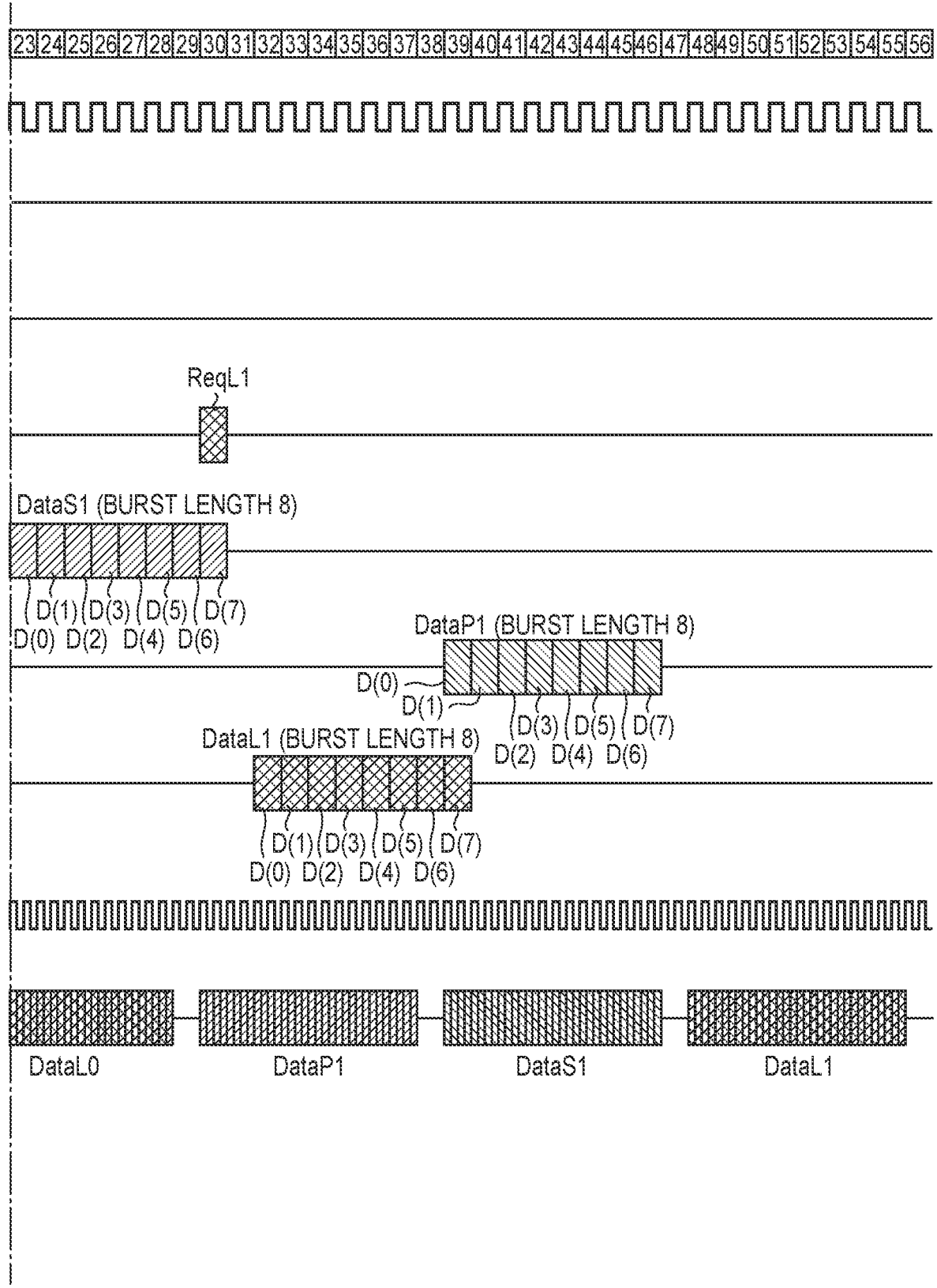
Figures 1, 11B:
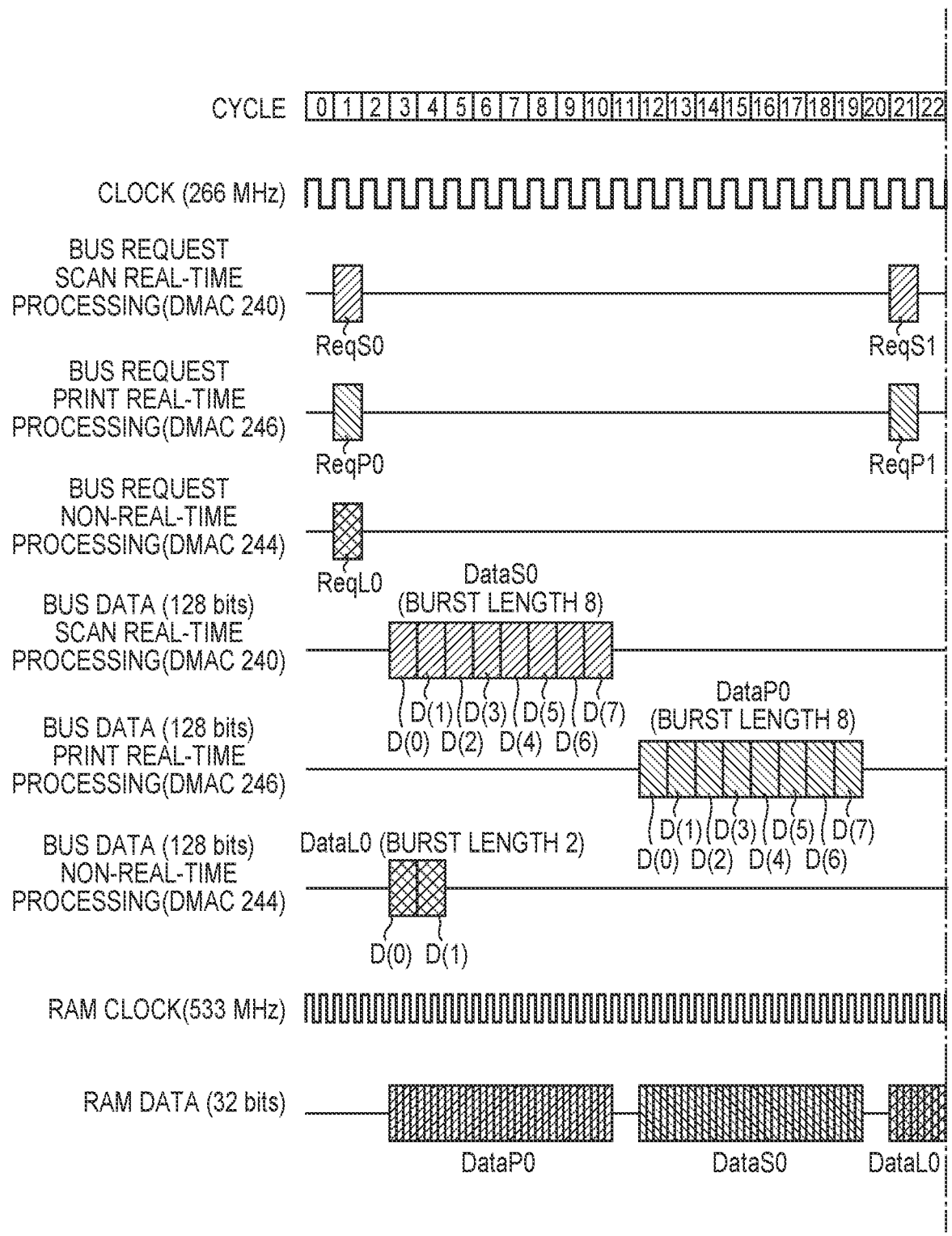
Figures 2, 11B:
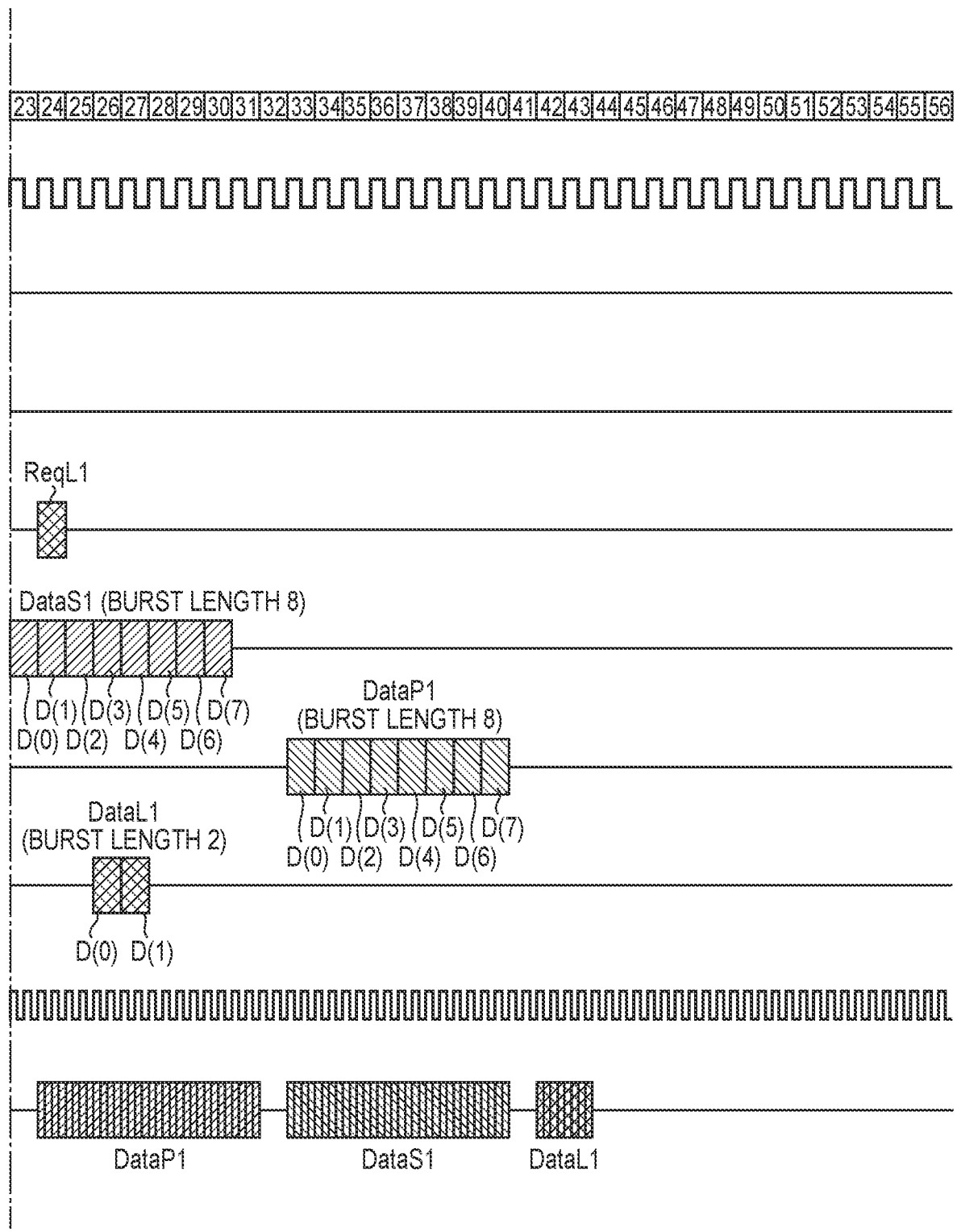

An operation in a case in which write image data transfer of a SEND job and readout image data transfer of a PDL_PRINT job in real-time processing, and write image data transfer in non-real-time processing occur simultaneously will be described next with reference to FIGS. 11A and 11B. Note that each of DMACs 240 and 246, and the DMAC 244 is connected to a bus of a 128-bit bus width operating at 266 MHz and issues a request of a burst length 8. The RAM 270 is a RAM of a 32-bit bus width with data transfer being performed at its two edges of 533 MHz. That is, data of a burst length 1 of a bus is transferred by four cycles of a RAM clock.

A use-memory-bandwidth in a case in which the burst length in the non-real-time processing is not changed to be short and in a case in which the burst length is changed to be short will be described below. First, an operation in the case in which the burst length in the non-real-time processing is not shortened will be described with reference to FIGS. 11A-1 and 11A-2.

In a cycle 1, the DMACs 240, 246, and 244 issue bus requests (ReqS0, ReqP0, and ReqL0). Image data (DataS0 and DataL0) written by the DMACs 240 and 244 are transferred from a cycle 3 to a cycle 10, and written in the buffers 261 and 262. On the other hand, the bus request (ReqP0) of the DMAC 246 is a request read out from the RAM 270, and thus image data is read out from the RAM 270 from the cycle 3 to the cycle 10.

Then, from a cycle 12 to a cycle 19, the write image data (DataS0) from the DMAC 240 stored in the buffer 261 is transferred to the RAM 270. On the other hand, readout image data (DataP0) read out from the RAM 270 is transferred to the DMAC 246.

In a cycle 21, the DMAC 240 issues a next bus request (ReqS1) because the image data (DataS0) of the buffer 261 is written in the RAM 270, and the buffer has a free space. Likewise, the DMAC 246 issues a next bus request (ReqP1) because readout of the readout data (DataP0) for the bus request (ReqP0) is complete.

From the cycle 21 to a cycle 28, the image data (DataL0) written in the buffer 262 is written. In a cycle 30, the DMAC 244 issues a next bus request (ReqL1) because the image data (DataL0) of the buffer 262 is written in the RAM 270, and the buffer has a free space.

As described above, the image data is transferred to the RAM 270 sequentially. Image data transfer for two bus requests of the DMACs 240 and 246 as the real-time processing is complete in a cycle 46.

Subsequently, an operation in the case in which the burst length in the non-real-time processing is changed to the burst length 2 will be described with reference to FIGS. 11B-1 and 11B-2. The operations of the DMACs 240 and 246 are the same as in FIGS. 11A-1 and 11A-2 from the cycle 1 to the cycle 21, and thus a description thereof will be omitted.

On the other hand, the DMAC 244 is set to have the burst length 2, and thus the image data (DataL0) is written in the buffer 262 from the cycle 3 to the cycle 4. The image data (DataL0) written in the buffer 262 is written in the RAM 270 from the cycle 21 to the cycle 22.

Since image data transfer from the DMAC 244 has the burst length 2, and thus image transfer to the RAM 270 is released in the cycle 22. Therefore, the image data of the bus request (ReqP1) issued in the cycle 21 is read out from the cycle 24 to a cycle 31, and image data (DataS1) from the DMAC 240 is written from a cycle 33 to a cycle 40.

If a change of the burst length in the DMAC 244 to the burst length 2 as the non-real-time processing is thus made, image data transfer for two bus requests of the DMACs 240 and 246 as the real-time processing is complete in the cycle 40. Note that an example in which the real-time processing has the burst length 8, and the non-real-time processing has the burst length 2 has been described here. However, the present invention is not limited to this. It is possible to increase a bandwidth assigned to the real-time processing by further prolonging the burst length in the real-time processing or further shortening the burst length in the non-real-time processing.

As described above, according to this embodiment, the use-memory-bandwidth used by the RAM 270 is monitored, and a use-memory-bandwidth for a memory access request from a non-real-time processing unit to the RAM 270 is decreased only if a possible memory bandwidth of the RAM 270 is nearly exceeded. This makes it possible to guarantee a transfer bandwidth of a real-time processing unit while using an available bandwidth of the RAM 270 at a maximum, that is, ensuring a situation capable of also using the non-real-time processing unit as much as possible. Note that this embodiment can be applied in combination with the first and second embodiments described above. That is, the CPU 200 or each DMAC may perform a determination of decreasing the use-memory-bandwidth for the memory access request.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (NPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-012541 filed on Jan. 26, 2017, which is hereby incorporated by reference herein in its entirety.

What is claimed is:

1. A memory access system comprising:
a memory;
an image processing unit that executes image processing;
a scanner that reads an original and generates image data;
a plurality of masters including at least a first master and a second master, the first master executing, via an internal bus, an access to the memory based on generation of image data by the scanner and the second master executing, via the internal bus, the access to the memory based on execution of image processing by the image processing unit; and
a monitor unit that
monitors a data amount, per predetermined time, transmitted via the internal bus in an access between each of the plurality of masters and the memory; and
calculates a total of the data amounts, per predetermined time, of the plurality of masters; and
a controller that reduces access to the memory via the internal bus by the second master among the plurality of masters and does not reduce access to the memory via the internal bus by the first master among the plurality of masters in a case where a predetermined condition regarding the total of the data amounts, per predetermined time, of the plurality of masters monitored by the monitor unit is satisfied.

2. The system according to claim 1, wherein the second master reduces access to the memory via the internal bus by stopping access to the memory via the internal bus.

3. The system according to claim 1, wherein the second master reduces access to the memory via the internal bus by shortening a burst length when the second master accesses the memory via the internal bus.

4. The system according to claim 1, wherein the second master executes data transfer by access to the memory via the internal bus in non-real time, and
the first master executes data transfer by access to the memory via the internal bus in real time.

5. The system according to claim 1, wherein the controller is a DMA (Direct Memory Access) controller.

6. The system according to claim 1, wherein
the predetermined condition is satisfied in a case where the total of the plurality of the monitored data amount per predetermined time is not less than a first threshold.

7. The system according to claim 6, wherein
the controller determines whether the calculated total of the data amounts, per predetermined time, of the plurality of masters is not more than a second threshold being less than the first threshold, after reducing access to the memory via the internal bus by the second master among the plurality of masters, and
does not reduce access to the memory via the internal bus by the second master in a case where it is determined that the total of the data amount per predetermined time is not more than the second threshold.

8. The system according to claim 7, further comprising:
a plurality of memory controller provided at between the memory and each of the plurality of masters, and
wherein each of the plurality of masters does not reduce access to the memory in a case where a signal permitting access to the memory has been received from the controller.

9. The system according to claim 6, wherein
the monitor unit monitors a data amount per predetermined time between the memory and each of the plurality of masters.

10. The system according to claim 1, further comprising:
a plurality of memory controller provided at between the memory and each of the plurality of masters, and
wherein each of the plurality of masters reduces access to the memory via the internal bus in a case where a signal reducing access to the memory has been received from the controller.

11. The system according to claim 1, wherein
the first threshold is individually provided for the plurality of masters, and
the controller reduces access to the memory via the internal bus by each master based on each first threshold assigned to each master.

12. The system according to claim 1, wherein
the controller access to the memory via the internal bus by stopping access to the memory via the internal bus.

13. The system according to claim 1, wherein
the access to memory based on generation of image data by the scanner includes an access for writing the image data generated by the scanner to the memory, and
the access to memory based on execution of image processing by the image processing unit includes an access for reading the image data stored in the memory to execute a RIP processing in the image processing.

14. A memory access system comprising:
a memory;
an image processing unit that executes image processing;
a scanner that reads an original and generates image data;
a plurality of masters including at least a first master and a second master, the first master executing, via an internal bus, an access to the memory based on generation of image data by the scanner and the second master executing, via the internal bus, the access to the memory based on execution of image processing by the image processing unit;
a monitor unit that
monitors a data amount, per predetermined time, transmitted via the internal bus in an access between each of the plurality of masters and the memory; and
calculates a total of the data amount, per predetermined time, of the plurality of masters; and
a memory controller that reduces access to the memory via the internal bus by the second master among the plurality of masters and does not reduce access to the memory via the internal bus by the first master in a case where a predetermined condition regarding the total of the data amounts, per predetermined time, of the plurality of the masters monitored by the monitor unit is satisfied.

15. The system according to claim 14, wherein
the monitor unit calculates a total of the plurality of the monitored memory-bandwidths data amount per predetermined time, and
the predetermined condition is satisfied in a case where the total of the plurality of the monitored data amount per predetermined time is not less than a predetermined threshold.

16. The system according to claim 14, wherein
the memory controller determines whether the calculated total of the plurality of the monitored data amount per predetermined time is not more than a threshold being less than the predetermined threshold, after reducing access to the memory, and does not reduce access to the memory by the second master in a case where it is determined that the calculated total of the monitored data amount per predetermined time is not more than the threshold being less than the predetermined threshold.

17. The system according to claim 16, wherein
the memory controller is provided at between each of the plurality of masters and the memory, and
each predetermined threshold of each of memory controllers is set based on each priority of the plurality of masters.

18. The system according to claim 14, wherein
the memory controller reduces access to the memory via the internal bus by stopping access to the memory via the internal bus.

19. An image forming apparatus comprising:
a memory access system;
an image processing unit that executes image processing;
a scanner that reads an image from an original; and
a printer that forms an image on a recording medium,
wherein the memory access system comprises
a memory;
a plurality of masters including at least a first master and a second master, the first master executing, via an internal bus, an access to the memory based on generation of image data by the scanner and the second master executing, via the internal bus, the access to the memory based on execution of image processing by the image processing unit;
a monitor unit that
monitors a data amount, per predetermined time, transmitted via the internal bus in an access between each of the plurality of masters and the memory; and
calculates a total of the data amount, per predetermined time, of the plurality of masters; and
a controller that reduces access to the memory via the internal bus by the second master among the plurality of masters and does not reduce access to the memory via the internal bus by the first master among the plurality of masters in a case where a predetermined condition regarding the total of the data amounts, per predetermined time, of the plurality of masters monitored by the monitor unit is satisfied.

20. The apparatus according to claim 19, wherein a process related to the image processing unit executes data transfer by access to the memory via the internal bus in non-real time, and
a process related to the scanner and the printer executes data transfer by access to the memory via the internal bus in real time.

21. The system according to claim 19, wherein
the access to memory based on transmission of image data from the memory to the printer includes an access for reading the image data from the memory, and
the access to memory based on execution of image processing by the image processing unit includes an access for reading the image data compressed in the image processing.

22. A method for controlling a memory access system that includes a memory, an image processing unit that executes image processing, a scanner that reads an original and generates image data, and a plurality of masters including at least a first master and a second master, the first master executing, via an internal bus, an access to the memory based on generation of image data by the scanner and the second master executing, via the internal bus, the access to the memory based on execution of image processing by the image processing unit, the method comprising executing:
monitoring a data amount, per determined time, transmitted via the internal bus in an access between each of the plurality of masters and the memory
calculating a total of the data amounts, per predetermined time, of the plurality of masters; and
reducing access to the memory via the internal bus by the second master among the plurality of masters and not reducing access to the memory via the internal bus by the first master among the plurality of masters in a case where a predetermined condition regarding the total of the data amounts, per predetermined time, of the plurality of masters monitored by the monitor unit is satisfied.

23. A non-transitory computer-readable storage medium storing a computer program for causing a computer to execute respective steps in a method for controlling a memory access system that includes a memory, an image processing unit that executes image processing, a scanner that reads an original and generates image data, and a plurality of masters including at least a first master and a second master, the first master executing, via an internal bus, an access to the memory based on generation of image data by the scanner and the second master executing, via the internal bus, the access to the memory based on execution of image processing by the image processing unit,
wherein the method executes
monitoring a data amount, per determined time, transmitted via the internal bus in an access between each of the plurality of masters and the memory
calculating a total of the data amounts, per predetermined time, of the plurality of masters and
reducing access to the memory via the internal bus by the second master among the plurality of masters and not reducing access to the memory via the internal bus by the first master among the plurality of masters in a case where a predetermined condition regarding the total of the data amounts, per predetermined time, of the plurality of masters monitored by the monitor unit is satisfied.

* * * * *